United States Patent
Liu et al.

(10) Patent No.: US 11,131,440 B2
(45) Date of Patent: Sep. 28, 2021

(54) REFLECTING DEVICE, LIGHT SOURCE MODULE AND LIGHTING DEVICE

(71) Applicant: OPPLE LIGHTING CO., LTD., Shanghai (CN)

(72) Inventors: Chaobo Liu, Shanghai (CN); Xuejun Feng, Shanghai (CN); Hongbo Wang, Shanghai (CN)

(73) Assignee: Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 16/537,944

(22) Filed: Aug. 12, 2019

(65) Prior Publication Data

US 2019/0360664 A1     Nov. 28, 2019

Related U.S. Application Data

(63) Continuation of application No. PCT/CN2018/076293, filed on Feb. 11, 2018.

(30) Foreign Application Priority Data

Feb. 15, 2017  (CN) .......................... 201710081165.X
Jun. 8, 2017   (CN) .......................... 201710429252.X
(Continued)

(51) Int. Cl.
*F21V 13/04*     (2006.01)
*F21V 29/75*     (2015.01)
(Continued)

(52) U.S. Cl.
CPC ................ *F21V 13/04* (2013.01); *F21K 9/68* (2016.08); *F21K 9/69* (2016.08); *F21V 7/048* (2013.01);
(Continued)

(58) Field of Classification Search
CPC ........ F21V 13/04; F21V 13/045; F21V 7/048; F21V 7/041; F21V 7/0091; F21V 7/0016; F21V 5/02; F21S 41/322; F21S 43/315
See application file for complete search history.

(56) References Cited

U.S. PATENT DOCUMENTS 6,616,305 B1 *   9/2003   Simon ................... F21V 7/0091
                                                        362/309
9,360,190 B1 *   6/2016   Shum .................. G02B 19/0061
(Continued)

FOREIGN PATENT DOCUMENTS

CN     102748706 A     10/2012
CN     103958962 A     7/2014
(Continued)

OTHER PUBLICATIONS

Machine translation of EP 0354961 A1 retrieved from Espacenet. (Year: 2020).*
(Continued)

*Primary Examiner* — Alexander K Garlen
*Assistant Examiner* — Colin J Cattanach
(74) *Attorney, Agent, or Firm* — Arch & Lake LLP

(57) ABSTRACT

A reflecting device is provided. The reflecting device includes a first optical element and a second optical element; the first optical element and the second optical element are both transparent; the second optical element has a side wall and a light emergent port; the side wall encloses an optical space in communication with the light emergent port; the first optical element is surrounded by the side wall of the second optical element and extends into the optical space; the first optical element has a light incident surface and a light emergent surface; and the light incident surface encloses an accommodating chamber.

15 Claims, 22 Drawing Sheets

(30) Foreign Application Priority Data

Jun. 8, 2017 (CN) .......................... 201720135936.4
Jun. 8, 2017 (CN) .......................... 201720663784.5

(51) Int. Cl.
*F21K 9/68* (2016.01)
*F21K 9/69* (2016.01)
*F21V 7/04* (2006.01)
*F21V 17/16* (2006.01)
*F21Y 115/10* (2016.01)
*F21S 43/31* (2018.01)
*F21S 41/32* (2018.01)
*F21V 7/00* (2006.01)

(52) U.S. Cl.
CPC ............ *F21V 17/164* (2013.01); *F21V 29/75* (2015.01); *F21S 41/322* (2018.01); *F21S 43/315* (2018.01); *F21V 7/0091* (2013.01); *F21Y 2115/10* (2016.08)

(56) References Cited

U.S. PATENT DOCUMENTS

| | | | | |
|---|---|---|---|---|
| 9,995,439 B1* | 6/2018 | Shum | ................... | F21V 17/105 |
| 10,502,392 B2* | 12/2019 | Schwalenberg | ...... | F21V 13/045 |
| 2004/0027833 A1* | 2/2004 | Amano | ................ | F21S 43/239 |
| | | | | 362/507 |
| 2004/0057244 A1* | 3/2004 | Amano | ................ | F21S 43/239 |
| | | | | 362/518 |
| 2004/0141323 A1* | 7/2004 | Aynie | .................... | F21S 43/247 |
| | | | | 362/308 |
| 2005/0078483 A1* | 4/2005 | Bernard | ................. | F21V 13/04 |
| | | | | 362/327 |
| 2010/0027282 A1* | 2/2010 | Gebauer | ............... | F21S 43/315 |
| | | | | 362/487 |
| 2011/0292670 A1* | 12/2011 | Hara | ........................ | F21V 5/04 |
| | | | | 362/519 |
| 2013/0077320 A1* | 3/2013 | Duan | .................... | F21V 7/0091 |
| | | | | 362/297 |
| 2016/0010809 A1* | 1/2016 | De Bevilacqua | ......... | F21K 9/60 |
| | | | | 362/294 |
| 2016/0258593 A1 | 9/2016 | Rodgers | | |
| 2018/0231209 A1* | 8/2018 | Schwalenberg | ...... | F21V 13/045 |

FOREIGN PATENT DOCUMENTS

| | | | |
|---|---|---|---|
| CN | 204665032 U | 9/2015 | |
| CN | 205402432 U | 7/2016 | |
| CN | 206093924 U | 4/2017 | |
| CN | 106678739 A | 5/2017 | |
| CN | 107166187 A | 9/2017 | |
| CN | 206608898 U | 11/2017 | |
| EP | 0354961 A1 * | 2/1990 | ............ F21S 43/315 |
| JP | 2004127689 A * | 4/2004 | ............. F21V 5/046 |

OTHER PUBLICATIONS

International Search Report (including English translation) and Written Opinion issued in PCT/CN2018/076293, dated May 4, 2018, 13 pages.

\* cited by examiner

REFLECTING DEVICE, LIGHT SOURCE MODULE AND LIGHTING DEVICE

CROSS-REFERENCE TO RELATED APPLICATIONS

This application is based upon and claims the priority of PCT patent application No. PCT/CN2018/076293 filed on Feb. 11, 2018 which claims the priority of Chinese Patent Application No. 201710429252.X filed on Jun. 8, 2017, Chinese Patent Application No. 201720663784.5 filed on Jun. 8, 2017, Chinese Patent Application No. 201720135936.4 filed on Feb. 15, 2017, and Chinese Patent Application No. 201710081165.X filed on Feb. 15, 2017, the entire content of all of which is hereby incorporated by reference herein for all purposes.

TECHNICAL FIELD

The present disclosure relates to the field of lighting technology, and more particularly, to a reflecting device, a light source module and a lighting device.

BACKGROUND

Electroplated reflectors are widely used in luminaires, for example, in lighting fixtures such as downlights, spotlights, ceiling lights and outdoor lightings. The electroplated reflector mainly serves to re-distribute light emitted by a light source.

SUMMARY

The present disclosure provides a reflecting device, a light source module and a lighting device.

According to a first aspect of the present disclosure, a reflecting device is provided. The reflecting device may include a first optical element and a second optical element; the first optical element and the second optical element may be both transparent; the second optical element may have a side wall and a light emergent port; the side wall may enclose an optical space in communication with the light emergent port; the first optical element may be surrounded by the side wall of the second optical element and may extend into the optical space; the first optical element may have a light incident surface and a light emergent surface; and the light incident surface may enclose an accommodating chamber.

According to a second aspect, a light source module is provided. The light source module may include a reflecting device and a light-emitting assembly, where the reflecting device may include a first optical element and a second optical element; the first optical element and the second optical element may be both transparent; the second optical element may have a side wall and a light emergent port; the side wall may enclose an optical space in communication with the light emergent port; the first optical element may be surrounded by the side wall of the second optical element and may extend into the optical space; the first optical element may have a light incident surface and a light emergent surface; and the light incident surface may enclose an accommodating chamber.

According to a third aspect, a lighting device is provided. The lighting device may include a light body, a light-emitting assembly accommodated in the light body, and a reflecting device configured to perform light distribution to the light-emitting assembly. The reflecting device may include a first optical element and a second optical element; the first optical element and the second optical element may be both transparent; the second optical element may have a side wall and a light emergent port; the side wall may enclose an optical space in communication with the light emergent port; the first optical element may be surrounded by the side wall of the second optical element and may extend into the optical space; the first optical element may have a light incident surface and a light emergent surface; and the light incident surface may enclose an accommodating chamber.

It is to be understood that both the foregoing general description and the following detailed description are exemplary and explanatory only and are not restrictive of the present disclosure.

BRIEF DESCRIPTION OF THE DRAWINGS

The drawings illustrated here are provided for further understanding the present disclosure and constitute a part of the present disclosure. Examples of the present disclosure, together with the description thereof, are used for explaining the present disclosure, rather than improperly limiting the present disclosure. In the drawings.

DETAILED DESCRIPTION

Figure 1:
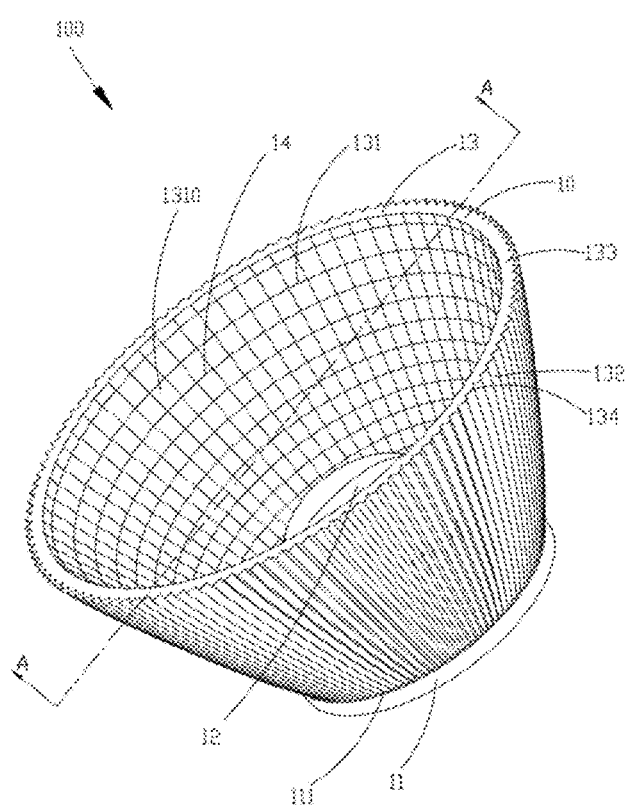
FIG. 1 is a structural schematic diagram of a light source module provided by Example 1 of the present disclosure.

The technical solutions of the present disclosure will be clearly and completely described below in connection with examples of the present disclosure and corresponding accompanying drawings, so that the objectives, technical solutions and advantages of the present disclosure are more understandable. Apparently, the described examples are just a part but not all of the examples of the present disclosure. Based on the described examples of the present disclosure, those skilled in the art can obtain other example(s), without any inventive work, which should be within the scope of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

An electroplated reflector may include a reflecting surface coated with a layer of metal film. However, the coating material itself may have a high absorption rate of light, for example, a loss rate of a silver plated film may be 5%, a loss rate of a gold plated film may be 9%, and a loss rate of an aluminum plated film may be up to about 12%, such that a light-emitting efficiency of a lamp to which the electroplated reflector is applied may be relatively low. Moreover, a lighting device to which the electroplated reflector is applied may have a relatively high cost. The present disclosure addresses those issues.

As illustrated in FIG. 1 to FIG. 6, Example 1 of the present disclosure provides a light source module 100, including a reflecting device 10 and a light-emitting assembly 2; in this example, the reflecting device 10 has an annular shape and includes a base 11 as well as a first lens 12 and a second lens 13 provided on the base 11; the first lens 12 and the second lens 13 are both transparent; the second lens 13 has a side wall 130 and a light emergent port 14; the side wall 130 encloses an optical space in communication with the light emergent port 14; the first lens 12 is surrounded by the side wall 130 of the second lens 13 and extends into the optical space; the first lens 12 has a first light incident surface 121 and a first light emergent surface 122; the first light incident surface 121 encloses an accommodating chamber 120; and the light-emitting assembly 2 is provided within the accommodating chamber 120 of the first lens 12. Light emitted by the light-emitting assembly 2 has one portion refracted by the first lens 12 and directly emitted through the light emergent port 14; and the other portion entering the side wall 130 through the optical space, reflected by the side wall 130, entering the optical space again, and then emitted through the light emergent port 14. The light source module 100 may be applied to lighting fixtures such as downlights, spotlights, ceiling lights, fresh market lights and outdoor lightings.

Hereinafter, respective components within the light source module 100 provided by the example of the present disclosure and a connection relationship between the components will be particularly described.

Figure 2:
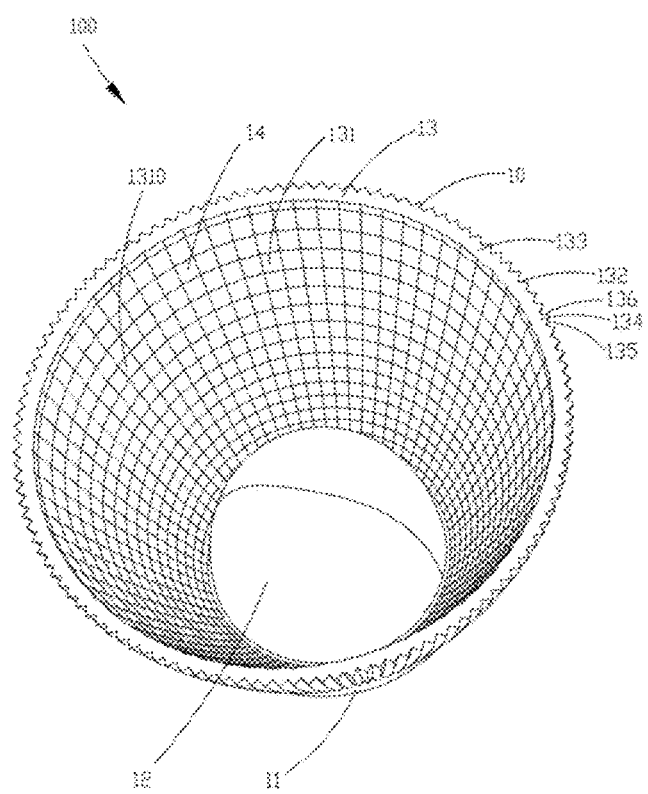
FIG. 2 is a structural schematic diagram of another perspective of the light source module provided by Example 1 of the present disclosure.
Figure 3:
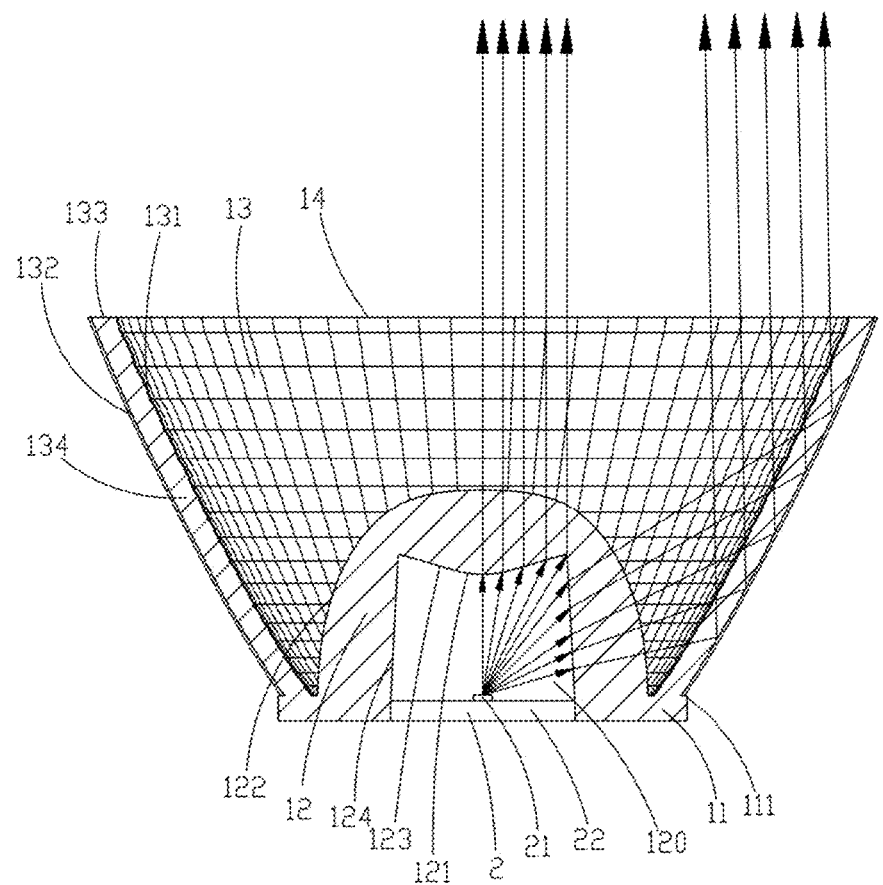
FIG. 3 is a cross-sectional view taken along line A-A in FIG. 1.

As illustrated in FIG. 1 to FIG. 3, the base 11 is a flat plate having an upper surface 111 connected with the first lens 12 and the second lens 13; and the second lens 13 is provided at an outer periphery of the first lens 12. In this example, the base 11, the first lens 12 and the second lens 13 are integrally formed.

The first lens 12 has a hemispherical shape, and has a first light incident surface 121, a first light emergent surface 122, and an accommodating chamber 120 for accommodating the light-emitting assembly 2. The first light incident surface 121 includes an upper light incident surface 123 and a side light incident surface 124; the upper light incident surface 123 is a bottom face of the accommodating chamber 120, the side light incident surface 124 is a side face of the accommodating chamber 120; and the upper light incident surface 123 is a convex surface protruded towards the accommodating chamber 120. The first light emergent surface 122 is a smooth curved surface. In this example, the first lens 12 is a commonly used optical element for controlling a light emergent angle of the light-emitting assembly 2. In other alternative examples, surface shapes of the first light incident surface 121 and the first light emergent surface 122 are not limited to the foregoing description, and may also be double curved surfaces having different curvatures, or a combination of other surface shapes, etc. which all fall within the scope of the present disclosure.

The second lens 13 has an annular shape and a uniform thickness. Specifically, the second lens 13 has a side wall 130, an inner surface 131, an outer surface 132, and an annular upper end surface 133; and the light emergent port 14 is located inside the upper end surface 133. The inner surface 131 is a second light incident surface of the reflecting device 10 and is also a second light emergent surface of the reflecting device 10; the inner surface 131 includes a plurality of successively arranged microstructures 1310 each having a circular arc surface; and in other alternative examples, microstructures 1301 may not be provided. The inner surface 131 subjected to surface microstructure treatment can more accurately control the light emergent angle of the light-emitting assembly and ensure uniformity of emergent light. The outer surface 132 is provided thereon with a plurality of successively arranged sawtooth structures 134. Each of the sawtooth structures 134 includes a first reflecting surface 135 and a second reflecting surface 136; the first reflecting surface 135 and the second reflecting surface 136 are perpendicular to each other and intersected with each other to form a ridge line, and the ridge line may be a straight line or may also be an arc line. Each of the sawtooth structures 134 has one end extending to the upper surface 111 of the base 11 (i.e., a lower end surface of the second lens 13), and the other end extending to the upper end surface 133 of the second lens 13, so that light incident on the side wall 130 may be reflected to a certain extent. In other alternative example, the sawtooth structure 134 may not extend to the upper end surface 133 and the lower end surface (not illustrated), and the sawtooth structure 134 may also be arranged as segments over the outer surface 132, such that a total reflection only occurs at a position where the sawtooth structure 134 is provided. In other implementation modes, an included angle between the first reflecting surface 135 and the second reflecting surface 136 may not be 90°, that is, may be less than or greater than 90°; however, a light effect of the reflecting device 10 is optimal and a total reflection may be implemented in the case where the included angle is 90°. Based on this principle, by adjusting the included angle between the first reflecting surface 135 and the second reflecting surface 136, at least 5% of light entering the side wall 130 may be directly transmitted through the second lens 13, and less than 95% of the light is totally reflected, so as to achieve another lighting effect.

In this example, an aperture of the second lens 13 at a side of the base 11 is smaller than an aperture of the light emergent port 14. In other alternative implementation modes, the aperture of the second lens 13 at the side of the base 11 may also be as same as the aperture of the light emergent port 14, that is, the second lens 13 has a straight cylindrical shape; and such a structure can not only allow the side wall 130 to implement a total reflection, but also allow light to be emitted through the light emergent port 14.

The reflecting device 10 is integrally made of a transparent plastic or glass material, in which the plastic material may be PMMA, PC, and the like. The reflecting device 10 may be fabricated as thin as 2 mm, so in the case where a structural size of the reflecting device 10 is very large, material costs and molding difficulties can be reduced. Moreover, it should be noted that, in mold design or molding process, due to the problem of processing accuracy, a rounded corner would be formed at an intersection line between the first reflecting surface 135 and the second reflecting surface 136 of the second lens 13, so that light incident on the rounded corner is refracted and emitted to form stray light; however, the rounded corner has little effect on a total light effect and a beam angle of the second lens 13; thus, theoretically, the second lens 13 still can be considered as a total reflection lens. Of course, it may also improve the transmittance of the reflecting device 10 by enlarging the rounded corner.

As illustrated in FIG. 3, the light-emitting assembly 2 includes a light source board 21 and a light-emitting unit 22 located on the light source board 21. Specifically, the light-emitting unit 22 is provided at a central portion of the light source board 21, that is, provided at a central portion of an opening of the accommodating chamber 120; and the number of the light-emitting units 22 may be one or plural.

In the case where the first reflecting surface 135 and the second reflecting surface 136 are perpendicular to each other and the side wall 130 can achieve a total reflection, a direction of an optical path within the reflecting device 10 is particularly described as below.

In conjunction with FIG. 2 to FIG. 6, light emitted from the light-emitting assembly 2 has one portion collimated from the upper light incident surface 123 to enter the first lens 12, refracted by the first lens 12 and directly emitted from the outer surface 122, and then emitted through the light emergent port 14; and the other portion entering the first lens 12 from the side light incident surface 124, refracted by the first lens 12 and emitted from the outer surface 122, incident onto the inner surface 131, reflected by the side wall 130, and then emitted through the light emergent port 14. The light is reflected within the side wall 130, and its optical path is specifically as follows: the light is incident from the inner surface 131 onto a point a of the first reflecting surface 135 on the outer surface 132, totally reflected to a point b of the second reflecting surface 136, totally reflected by the second reflecting surface 136 back to the inner surface 131, emitted from the inner surface 131 and then emitted through the light emergent port 14.

Figure 4:
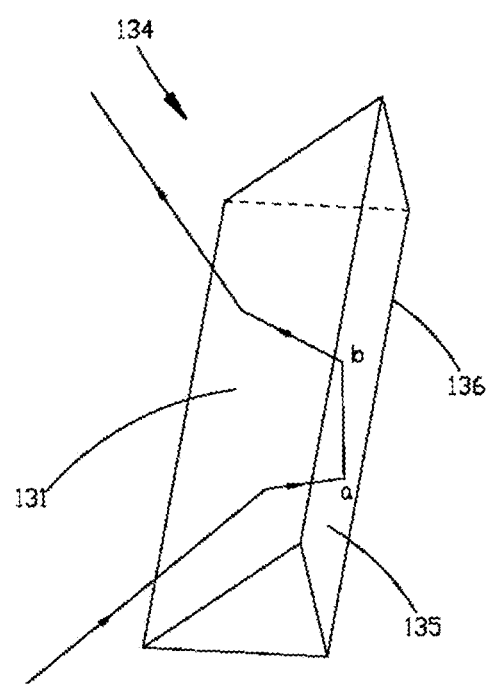
FIG. 4 is a schematic diagram of an optical path in a vertical direction with a single sawtooth structure as an example according to Example 1 of the present disclosure.

As illustrated in FIG. 4, with respect to a single sawtooth structure 134, from a plan view, when the light is incident onto the point a of the first reflecting surface 135, it would be reflected to the point b of the second reflecting surface 136 according to the principle of total reflection, then reflected from the point b of the second reflecting surface 136 and emitted; and the final emergent light and the incident light conform to a total reflection angle relationship. As known, in order to implement total reflection inside the lens, an incident angle between light and a reflecting surface must be large enough, otherwise, the light will be transmitted to the outside; and the incident angle will vary depending on the material of the lens.

Figure 5:
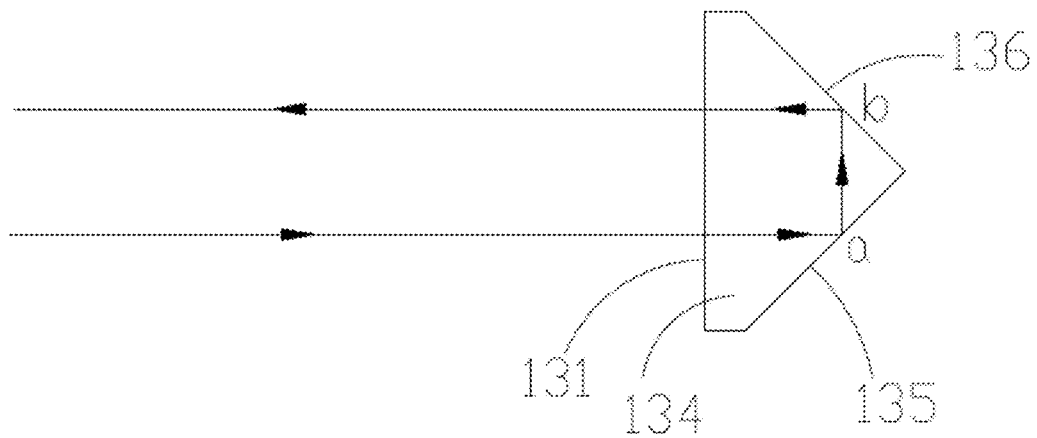
FIG. 5 is a schematic diagram of an optical path in a horizontal direction with a single sawtooth structure as an example according to Example 1 of the present disclosure.
Figure 6:
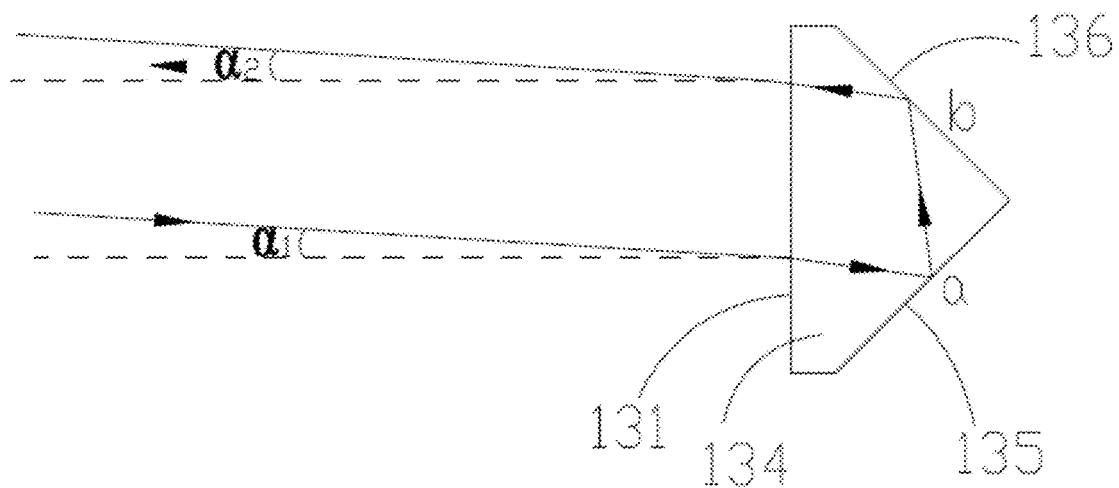
FIG. 6 is a schematic diagram of another optical path in the horizontal direction with a single sawtooth structure as an example according to Example 1 of the present disclosure.

It can be seen from FIG. 5 that, if there is no sawtooth structure provided on the light emergent surface, that is, if the light emergent surface is parallel to the light incident surface, the incident angle is 0° when the light arrives at the reflecting surface, so the light can only be transmitted without total reflection; after the sawtooth structure is added, when the light arrives at the point a of the first reflecting surface 135, the incident angle is 45°, which is larger than a critical angle, so that a total reflection can be implemented. When the light-emitting unit 22 is located at a central position of the light source board 21, because the reflecting device 10 according to this example has a rotationally axisymmetric structure, for every position on the inner surface 131, light emitted by the reflecting device 10 is always perpendicular to the inner surface 131 as viewed from a horizontal direction; as described above, the incident angle of light arriving at the first reflecting surface 135 and the incident angle of light arriving at the second reflecting surface 136 are both 45°, and a total reflection can be achieved. However, in the case of a plurality of light-emitting units 22, these light-emitting units 22 will be arranged on the light source board 21 to form a light-emitting surface having a certain area, so there is a certain horizontal incident angle $\alpha_1$ for the light incident on the inner surface 131; when the light is refracted and then arrives at the first reflecting surface 135 of the sawtooth structure 134, the incident angle becomes 45° minus $\alpha_1$, that is, the incident angle is decreased, and a total reflection cannot be ensured. Therefore, it has to try to avoid such a case and concentrate the light-emitting units 22 in a central region of the light source board 21, so that the horizontal incident angle $\alpha_1$ is as small as possible.

Lenses made of different materials have different allowable ranges for the horizontal incident angle $\alpha_1$. For a lens made of PMMA, $\alpha_1 \leq 4.4°$; and for a lens made of PC, $\alpha_1 \leq 9.5°$. Because the sawtooth structure according to this example is a right-angled prism, an emergent angle $\alpha_2$ is equal to the horizontal incident angle $\alpha_1$. In a structure of a non-right-angled prism, the emergent angle $\alpha_2$ changes with the incident angle $\alpha_1$ to achieve different light effects.

Figure 7:
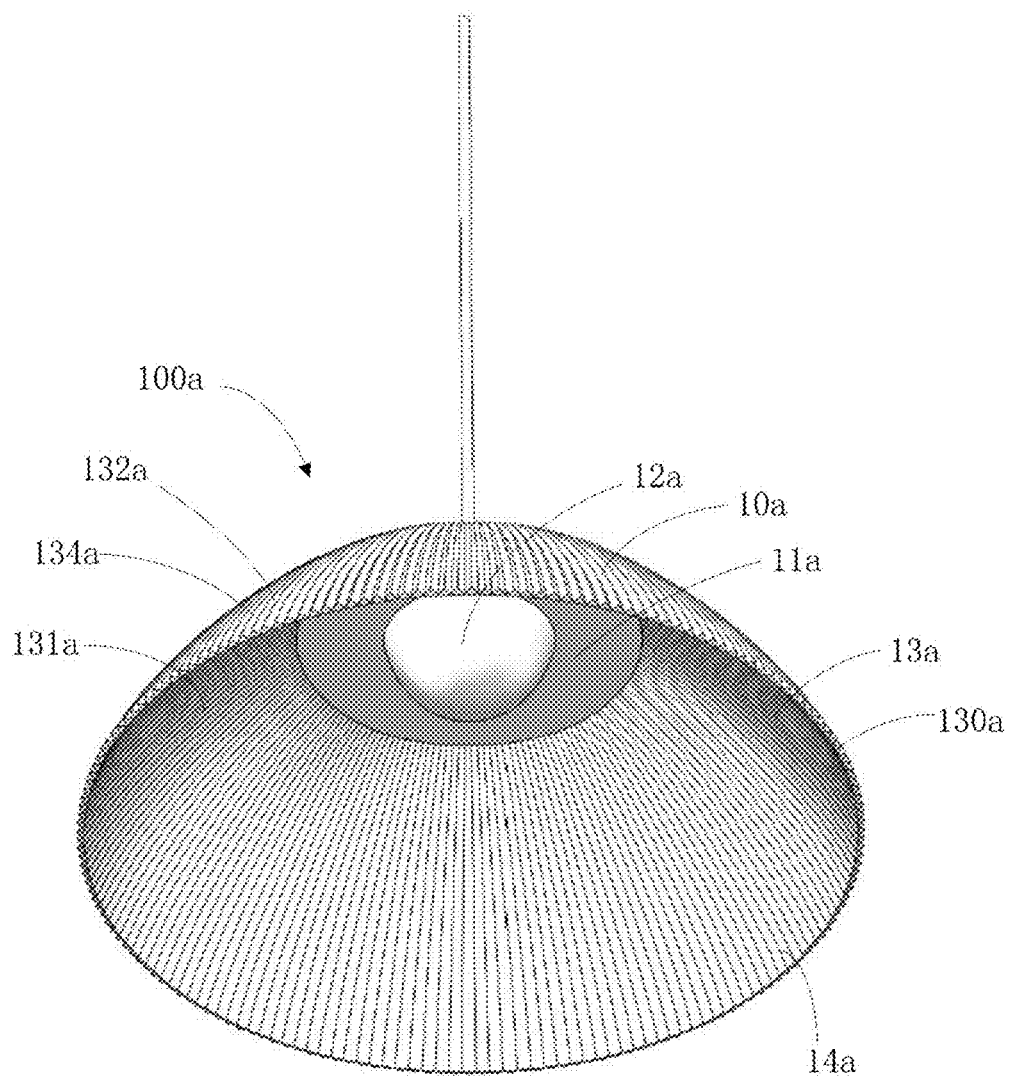
FIG. 7 is a structural schematic diagram of a light source module provided by Example 2 of the present disclosure.
Figure 8:
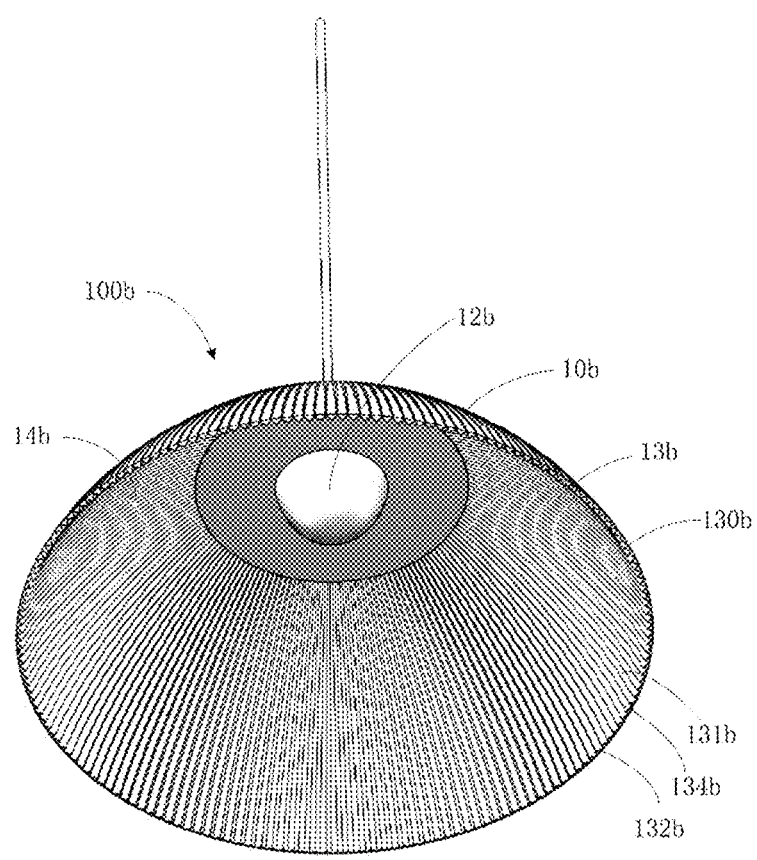
FIG. 8 is a structural schematic diagram of another light source module provided by Example 2 of the present disclosure.

As illustrated in FIG. 7 and FIG. 8, Example 2 provides a light source module 100a and a light source module 100b for use in a ceiling light.

As illustrated in FIG. 7, the light source module 100a provided by this example includes a reflecting device 10a and a light-emitting assembly (not illustrated). The reflecting device 10a has a structure substantially similar with that of the reflecting device 10 in Example 1. The reflecting device 10a has an annular shape and includes a base 11a, as well as a first lens 12a and a second lens 13a provided on the base 11a; the first lens 12a and the second lens 13a are both transparent; the second lens 13a has a side wall 130a and a light emergent port 14a; the side wall 130a encloses an optical space in communication with the light emergent port 14a; the first lens 12a is surrounded by the side wall 130a of the second lens 13a and extends into the optical space; and the light-emitting assembly (not illustrated) is provided within an accommodating chamber (not illustrated) of the first lens 12a. The side wall 130a of the second lens 13a has an inner surface 131a and an outer surface 132a; the inner surface 131a is a smooth wall surface, and the outer surface 132a is provided thereon with a plurality of successively arranged sawtooth structures 134a. The light-emitting assembly (not illustrated) of the light source module 100a includes a light source board and a light-emitting unit, and may further be integrally provided with a drive component or an external drive component; when an external power line is electrically connected with the light source board, the light source module 100a may be used as a wire-hanging light or a decorative light, for example, a pendant dining light.

Figure 10:
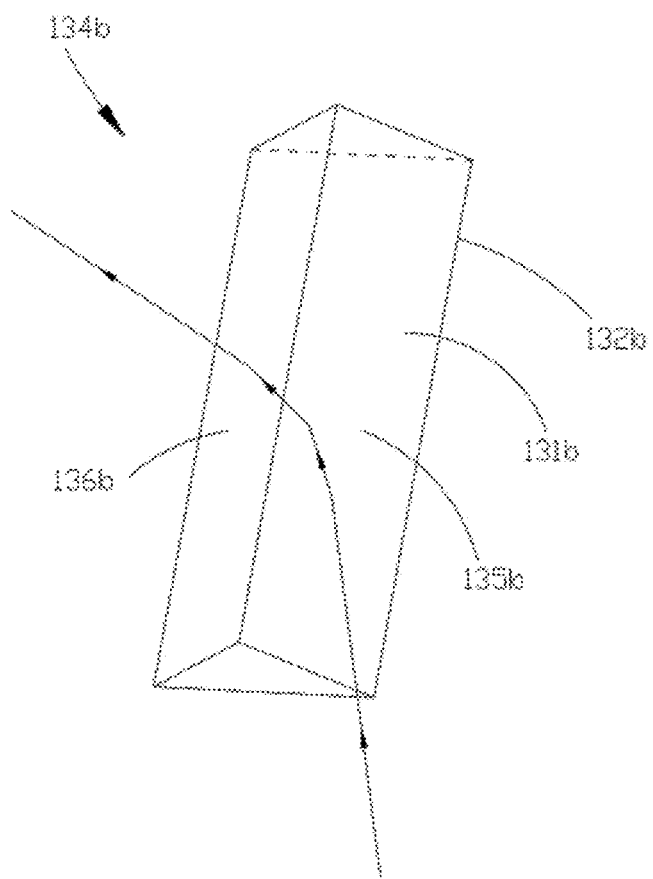
FIG. 10 is a schematic diagram of an optical path in a vertical direction with a single sawtooth structure as an example based on FIG. 8.

As illustrated in FIG. 8 and FIG. 10, the light source module 100b provided by this example includes a reflecting device 10b and a light-emitting assembly 2b; the reflecting device 10b includes a base 11b, as well as a first lens 12b and a second lens 13b provided on the base 11b; the first lens 12b and the second lens 13b are both transparent; the second lens 13b has a side wall 130b and a light emergent port 14b; the side wall 130b encloses an optical space in communication with the light emergent port 14b; the first lens 12b is surrounded by the side wall 130b of the second lens 13b and extends into the optical space; and the light-emitting assembly 2b is provided in an accommodating chamber 120b of the first lens 12b. The side wall 130b of the second lens 13b has an inner surface 131b and an outer surface 132b; the inner surface 131b is provided thereon with a plurality of successively arranged sawtooth structures 134b, and the outer surface 132b is a smooth wall surface. The sawtooth structure 134b includes a first refracting surface 135b and a second refracting surface 136b; the first refracting surface 135b and the second refracting surface 136b are perpendicular to each other and intersected with each other to form a ridge line, and the ridge line may be a straight line or may also be an arc line. The light-emitting assembly 2b includes a light source board 21b and a light-emitting unit 22b located on the light source board 21b. Specifically, the light-emitting unit 22b is provided at a central portion of the light source board 21b, that is, provided at a central portion of an opening of the accommodating chamber 120b; and the number of the light-emitting units 22b may be one or plural.

Figure 9:
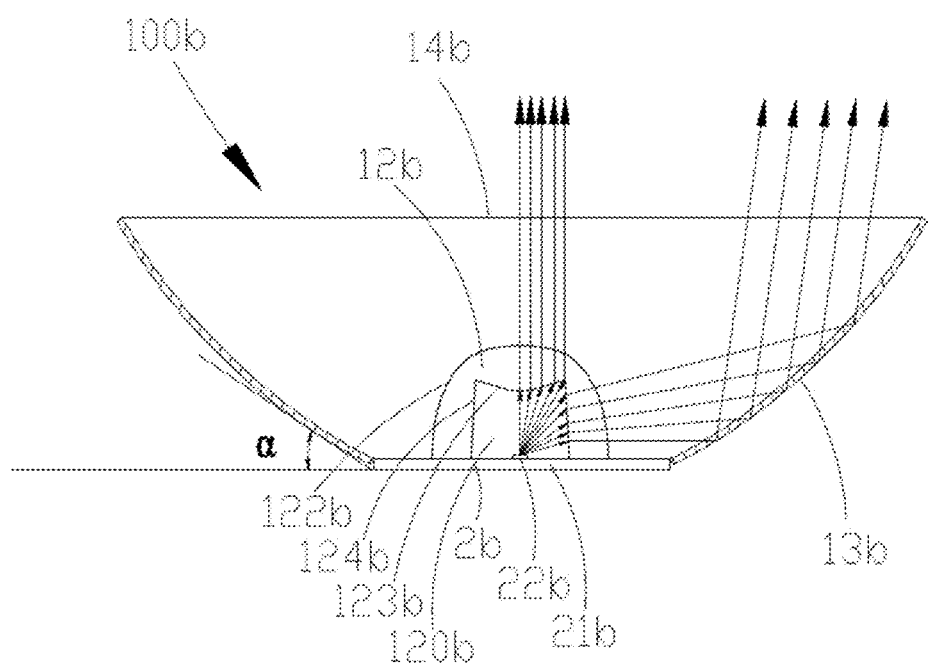
FIG. 9 is a schematic diagram of an optical path of the light source module based on FIG. 8.

As illustrated in FIG. 9, in order for all the light incident into the second lens 13b to be totally reflected on the outer surface 132b, it is necessary to configure the angle between the light and the outer surface 132b, and a total reflection may be achieved when the incident angle in the vertical direction is greater than a certain angle. The incident angle in the vertical direction being greater than a certain angle refers to that, an included angle $\alpha$ formed between the ridge line formed by the first refracting surface 135b intersected with the second refracting surface 136b and a plane where the light source board 21b is located needs to be less than a specific angle A; a refraction would be occurred if light is incident from the first refracting surface 135b or the second refracting surface 136b, so that the incident angle of the light on the outer surface is increased; and if the light is incident from a ridge line position, there is barely an angle in the horizontal direction, which is most difficult for achieving a total reflection; therefore, a design of total reflection surface of the second lens 13b is always considered in such a manner that a value of A is calculated with an optical path of the ridge line position. The included angle $\alpha$ is related to a refractive index of the second lens 13b; in this example, if a PC material is selected, A is 38°; if a material with a higher refractive index is selected, A may be 40°; and if PMMA is selected, A is 30°.

With respect to the light source module 100b according to this example, because each of the sawtooth structures 134b of the second lens 13b has a straight-bar shape, the included angle $\alpha$ between the ridge line and the plane where the light source board 21b is located is a fixed value; when the ridge line is an arc line, an included angle $\alpha$ between a tangent line of each point on the ridge line and the plane where the light source board is located shall conform to the above-described restrictive condition, that is, a value of the included angle $\alpha$ is less than A (A is an angle depending on the material as described above). Therefore, when it is satisfied that the included angle $\alpha$ is smaller than angle A corresponding to the material as described above (A represents an angle depending on the material as described above), the second lens 13b satisfies the total reflection condition. In other implementation modes in which total reflection of the lens is not required, it is unnecessary to satisfy the condition that the included angle $\alpha$ is less than A, that is, any included angle between 0° to 90° may be used; in this way, a transflective effect may be achieved on the outer surface 132b.

Figure 11:
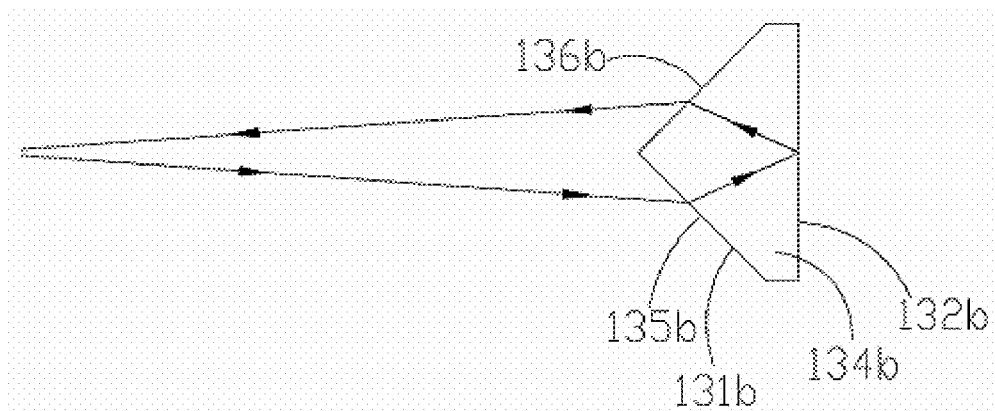
FIG. 11 is a schematic diagram of an optical path in a horizontal direction with a single sawtooth structure as an example based on FIG. 8.

In conjunction with FIG. 9 to FIG. 11, an optical path of light emitted by the light-emitting assembly 2b within the first lens 12b is as same as that in Example 1. The light emitted by the first lens 12b is reflected within the side wall 130, and its optical path is specifically as follows: the light is incident on the inner surface 131b of the second lens 13b, refracted by the first refracting surface 135b of the sawtooth structure 134b on the inner surface 131b to the outer surface 132b, totally reflected by the outer surface 132b to the inner surface 131b, refracted by the inner surface 131b and then emitted through the light emergent port 14b. Both FIG. 10 and FIG. 11 only illustrate a particular direction of light entering the sawtooth structure 134b. Specifically, the light is totally reflected by the outer surface 132b to the second refracting surface 136b of the inner surface 131b and then emitted. There is further a portion of light (not illustrated)

emitted by the light-emitting assembly 2b, which is reflected by the outer surface 132b to the first refracting surface 135b of the inner surface 131b and then emitted, or is reflected by the outer surface 132b to the ridge line where the first refracting surface 135b and the second refracting surface 136b are intersected with each other and then emitted.

Figure 12:
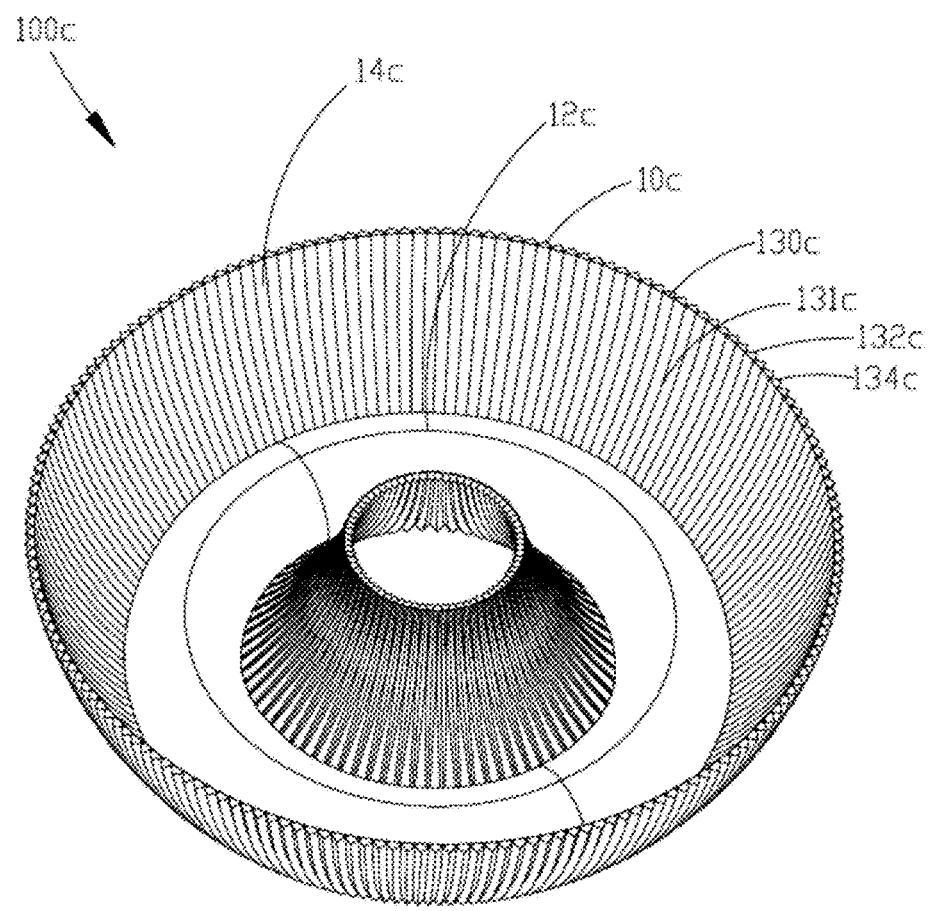
FIG. 12 is a structural schematic diagram of a light source module provided by Example 3 of the present disclosure.

As illustrated in FIG. 12, Example 3 provides a light source module 100c, including a reflecting device 10c and a light-emitting assembly (not illustrated); the reflecting device 10c has a rotary-shaped structure, and includes an annular first lens 12c and an annular second lens 13c; the first lens 12c and the second lens 13c are both transparent; the second lens 13c has two annular side walls 130c as well as an annular light emergent port 14c formed by the two side walls 130c; the two annular side walls 130c enclose an annular optical space in communication with the light emergent port 14c; the first lens 12c is surrounded by the two side walls 130c of the second lens 13c and extends into the optical space; and the light-emitting assembly (not illustrated) is provided within an accommodating chamber (not illustrated) of the first lens 12c. The side wall 130c of the second lens 13c has an inner surface 131c and an outer surface 132c; the inner surface 131c is a smooth wall surface, and the outer surface 132c is provided thereon with a plurality of successively arranged sawtooth structures 134c.

In other alternative implementation modes, the sawtooth structure 134c may also be provided on the inner surface 131c, while and the outer surface 132c is configured as a smooth wall surface.

Figure 13:
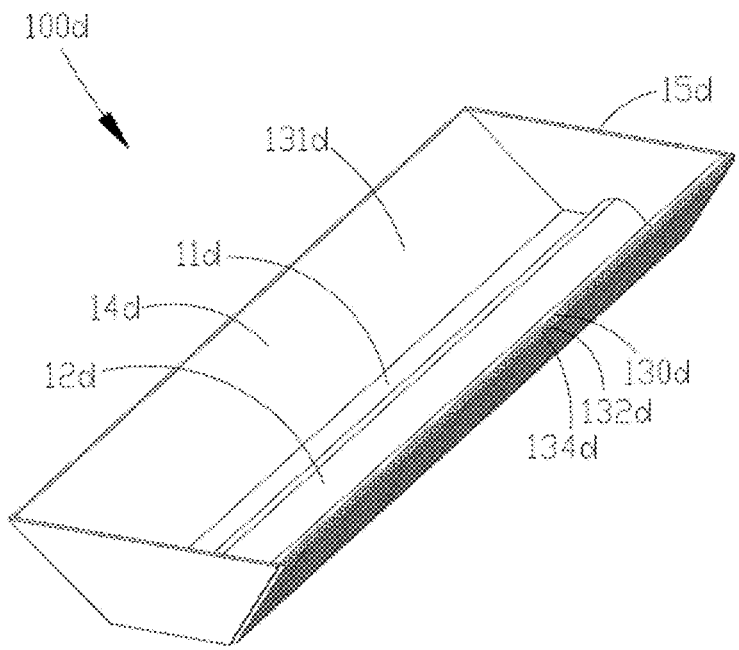
FIG. 13 is a structural schematic diagram of a light source module provided by Example 4 of the present disclosure.
Figure 14:
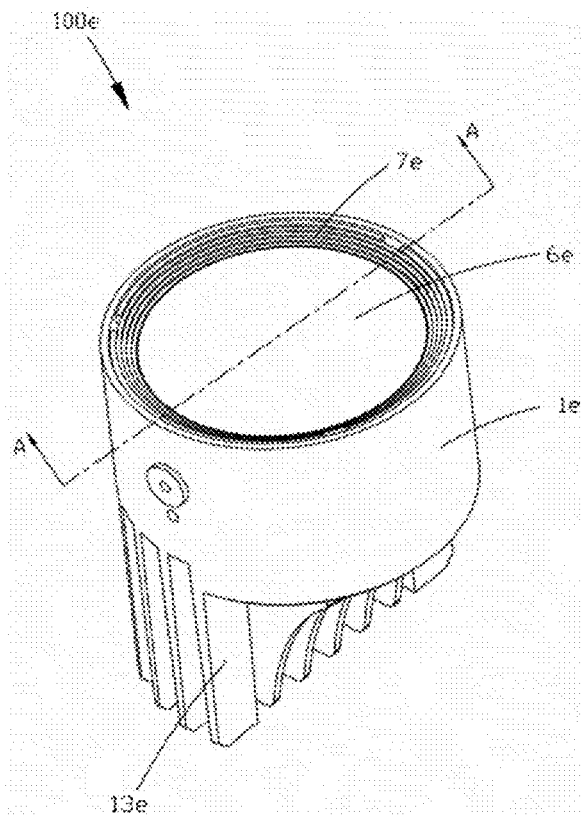
FIG. 14 is a stereoscopic schematic diagram of a lighting device provided by Example 5 of the present disclosure.
Figure 15:
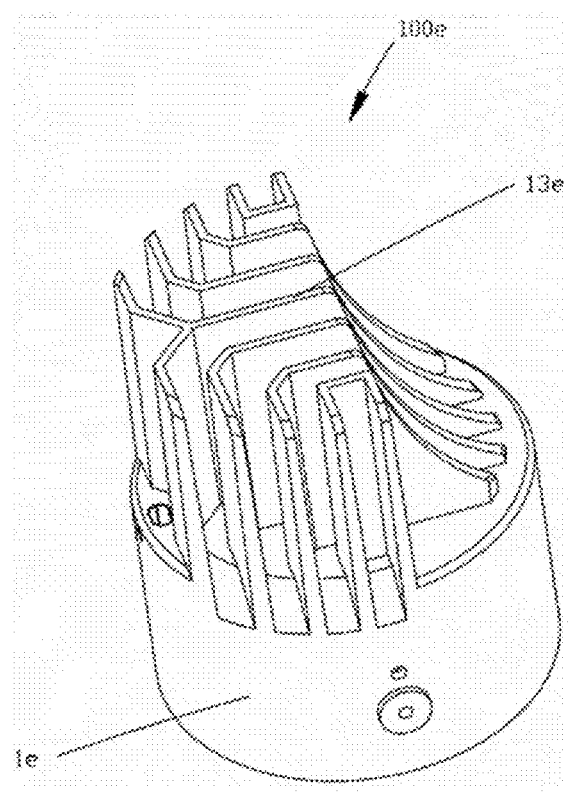
FIG. 15 is a stereoscopic schematic diagram of another perspective of the lighting device provided by Example 5 of the present disclosure.

As illustrated in FIG. 13, Example 4 provides a light source module 100d, including a reflecting device 10d and a light-emitting assembly (not illustrated); the reflecting device 10d has a straight-bar shape, and includes a bar-shaped first lens 12d extending along a length direction of a base 11d, two second lenses 13d provided opposite to each other, and a connecting plate 15d provided between the two second lenses 13d. The first lens 12d, the second lenses 13d and the connecting plate 15d, together, enclose an optical space, and form a light emergent port 14d; and the optical space is in communication with the light emergent port 14d. The first lens 12d and the second lens 13d are both transparent, and the light-emitting assembly (not illustrated) is provided within an accommodating chamber (not illustrated) of the first lens 12d. The second lens 13d has a side wall 130d; the side wall 130d has an inner surface 131d and an outer surface 132d; the inner surface 131d is a smooth wall surface, and the outer surface 132d is provided thereon with a plurality of successively arranged sawtooth structures 134d.

In other alternative implementation modes, the sawtooth structure 134d may also be provided on the inner surface 131d, while the outer surface 132d is configured as a smooth wall surface.

As illustrated in FIG. 14 to FIG. 19, Example 5 of the present disclosure provides a lighting device 100e, which is a spotlight. Particularly, the lighting device 100e includes a light body 1e, a light-emitting assembly 2e accommodated in the light body 1e, a fixing structure 3e for mounting the light-emitting assembly 2e, a reflecting device for performing light distribution to the light-emitting assembly 2e, a light-transmitting plate 6e which blocks a light emergent port of the light body 1e, and a face ring 7e which is connected with the light body 1e to fix the light-transmitting plate 6e onto the light body 1e. The reflecting device includes a lens 4e and a reflector 5e; the reflector 5e has a cup-like annular shape and is transparent; and after light emitted by the light-emitting assembly 2e is subjected to light distribution of the lens 4e, the light has one portion directly emitted through the light-transmitting plate 6e, and the other portion reflected by the reflector 5e and then emitted through the light-transmitting plate 6e.

Hereinafter, respective components within the lighting device 100e provided by the example of the present disclosure and a connection relationship between the components will be particularly described.

Figure 16:
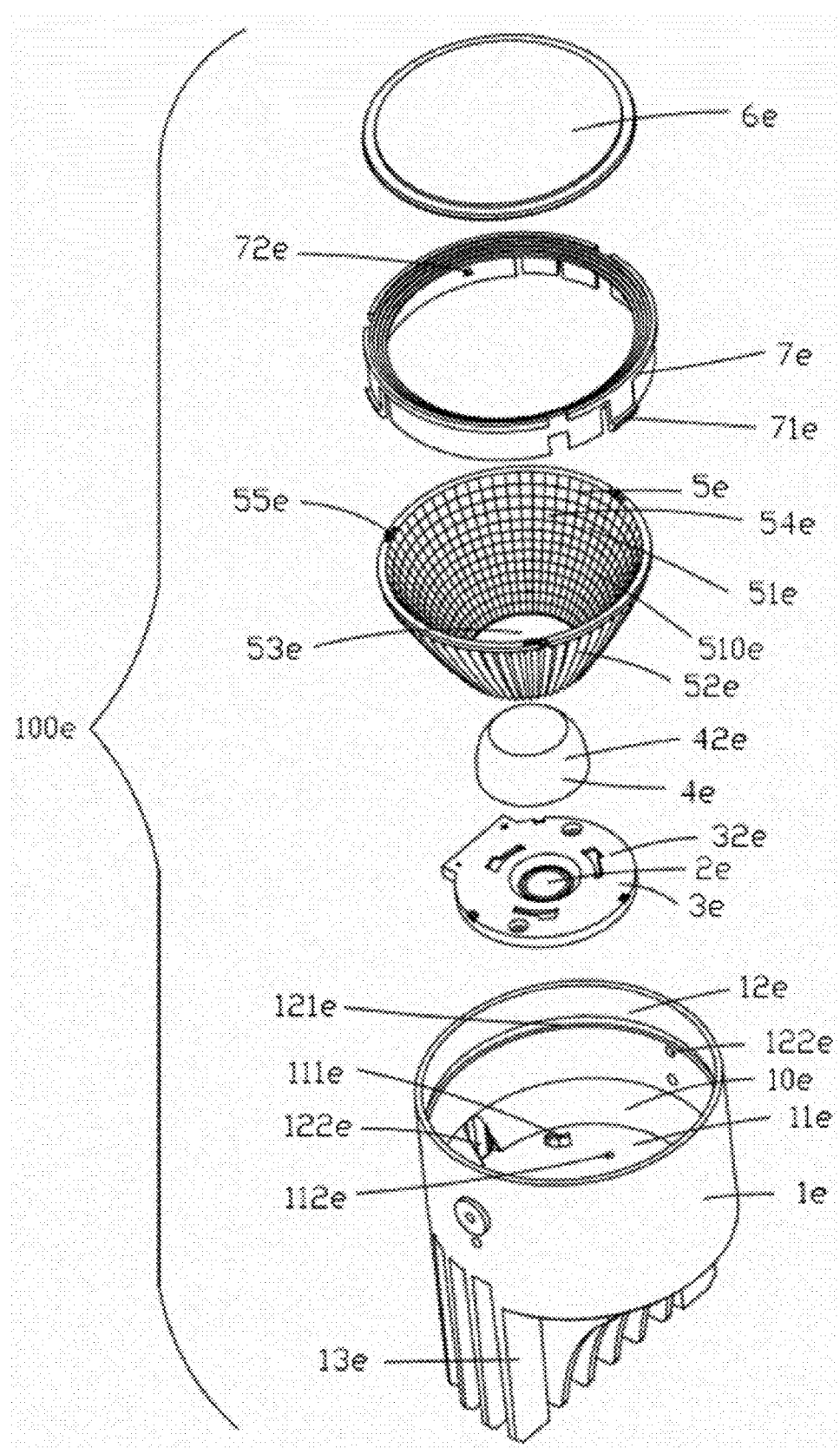
FIG. 16 is an exploded schematic diagram of the lighting device of FIG. 14.
Figure 17:
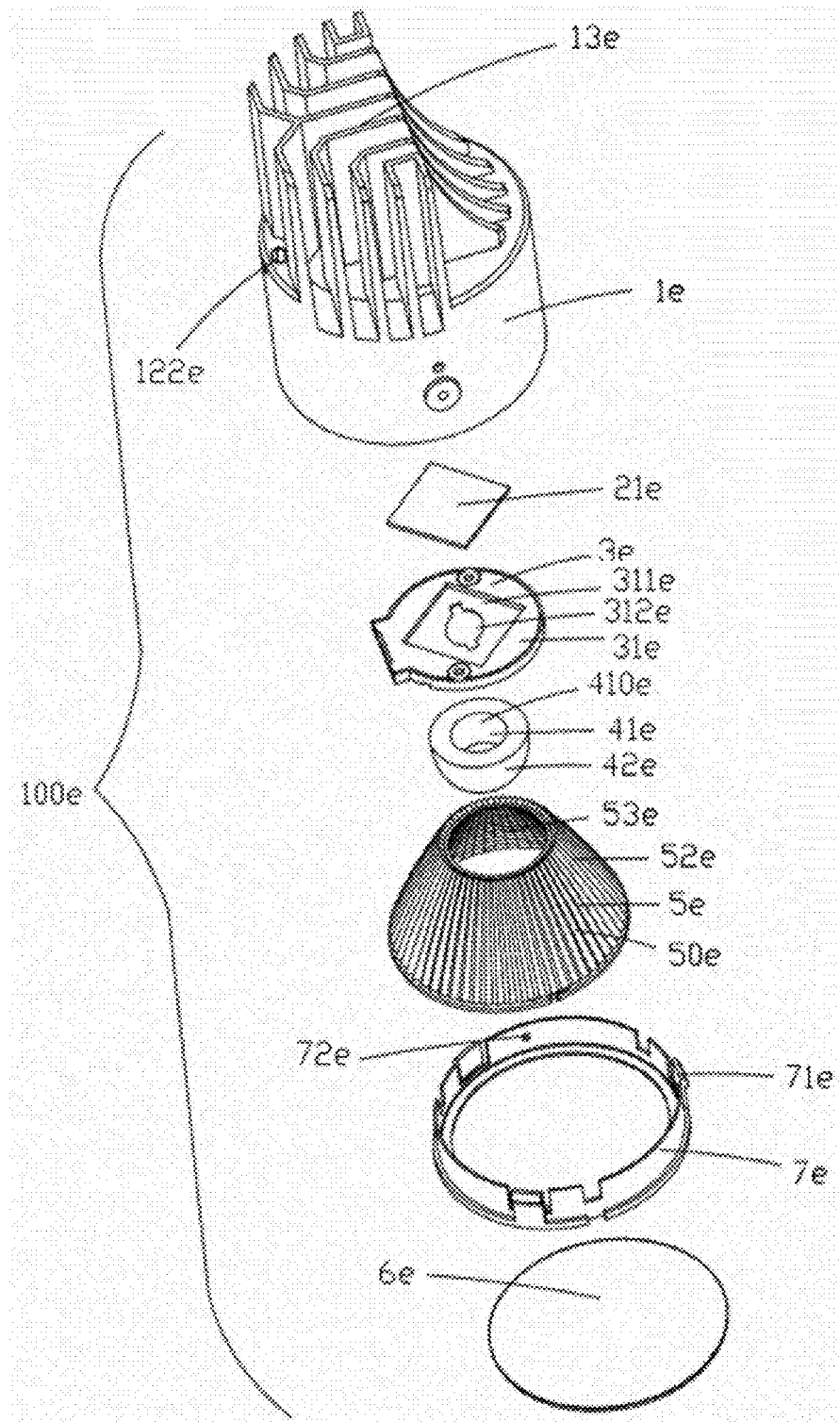
FIG. 17 is an exploded schematic diagram of another perspective of the lighting device of FIG. 14.

As illustrated in FIG. 16 and FIG. 17, the light body 1e has a cylindrical shape, and includes a bottom wall 11e and a side wall 12e; and the bottom wall 11e and the side wall 12e enclose an accommodating chamber 10e. An outer surface of the bottom wall 11e is provided thereon with a heat dissipation structure 13e, and specifically, the heat dissipation structure 13e is composed of a plurality of fin structures extending downward from the bottom wall 11e. An inner surface of the bottom wall 11e is provided thereon with a positioning member 111e for positioning the fixing structure 3e, as well as at least two accommodating holes 112e for connecting with the fixing structure 3e. The inner surface of the side wall 12e is provided with a circle of ribs 121e for a snap-fit connection with the face ring 7e; and in other alternative example, it may also be a groove, that is, connecting structures for a snap-fit connection between the light body 1e and the face ring 7e may be interchanged there-between. In addition, the light body 1e is further provided thereon with a first via hole 122e for a power line (not illustrated) to pass there-through, and the first via hole 122e may be provided on the bottom wall 11e or the side wall 12e. The light body 1e may be made of a heat conductive metal material such as aluminum, or may also be integrally formed of a heat conductive plastic or an aluminum coated plastic material, so as to have high thermal conductivity; and when the light-emitting assembly 2e located within the accommodating chamber 10e generates heat, the heat may be quickly dissipated through the light body 1e, so as to avoid an excessively high temperature within the accommodating chamber 10e which would affect the service quality and service life of the light-emitting assembly 2e.

Figure 18:
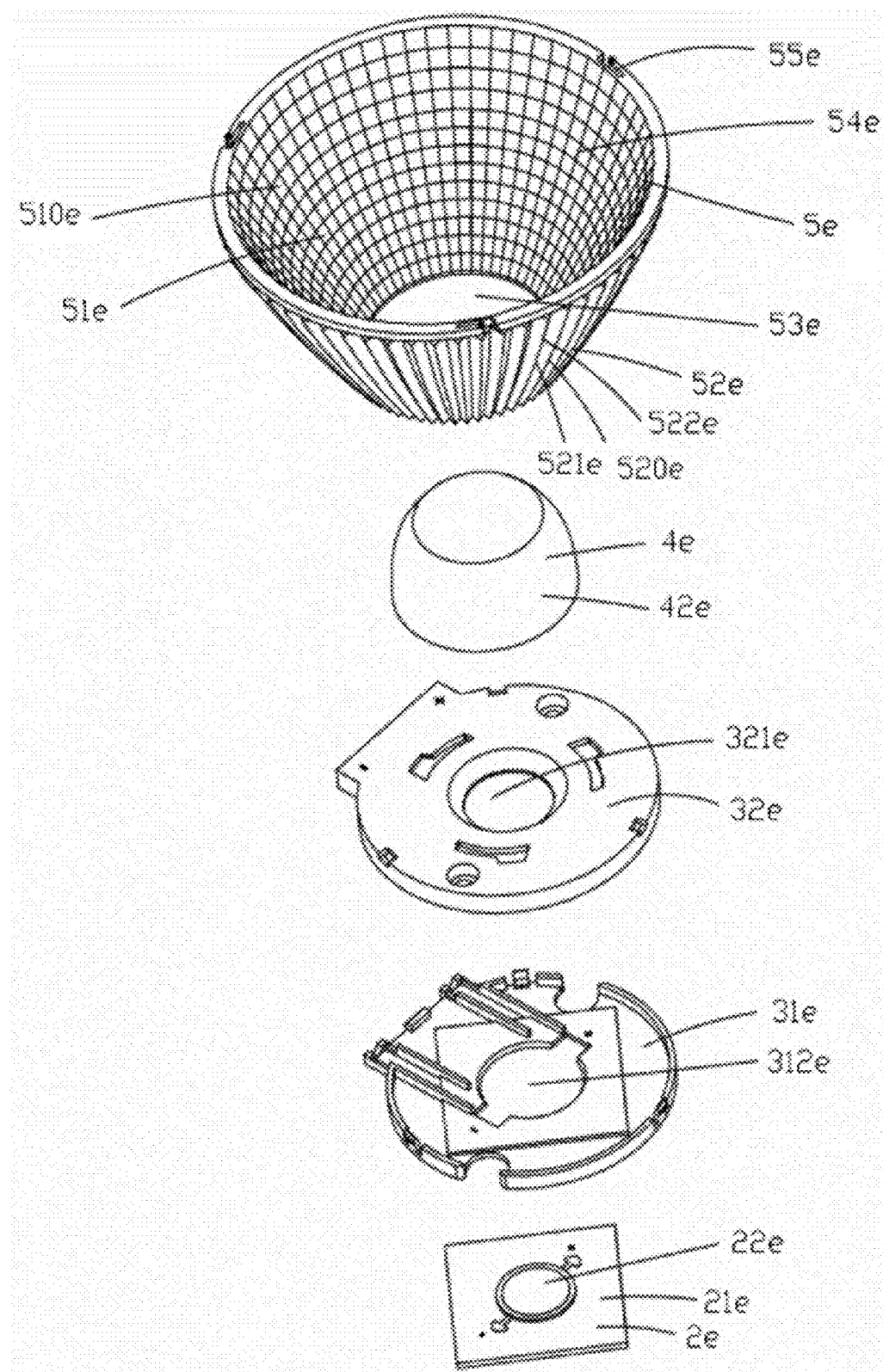
FIG. 18 is a partially exploded schematic diagram based on FIG. 16.

As illustrated in FIG. 16 to FIG. 18, the light-emitting assembly 2e includes a light source board 21e and a light-emitting unit 22e located on the light source board 21e. Specifically, the light-emitting unit 22e is provided at a central portion of the light source board 21e. In this example, the light-emitting unit 22e is a LED light source; the number of the light-emitting unit 22e may be one or plural; and when the number of the light-emitting unit 22e is plural, it is necessary to concentrate the light-emitting units 22e in a central region of the light source board 21e. The lighting device 100e provided by the present disclosure further includes a drive power component (not illustrated), and the drive power component may be integrally provided on the light source board 21e, or may also be separately provided within the light body 1e and electrically connected with the light source board 21e to supply power to the light-emitting unit 22e.

The fixing structure 3e includes a first pressing piece 31e and a second pressing piece 32e that are connected with each other; the fixing structure 3e fixes the light-emitting assembly 2e onto the bottom wall 11e; in this example, the second pressing piece 32e and the first pressing piece 31e are in snap-fit connection with each other; and in other alternative examples, they may also be connected with each other in other mode(s). A lower surface of the first pressing piece 31e is attached with the bottom wall 11e, and a central portion of the lower surface is recessed with a depression 311e for accommodating the light source board 21e; the first pressing piece 31e is further provided with a second via hole 312e running through an upper surface and a lower surface thereof, and the second via hole 312e is in communication with the depression 311e. In this example, the light source board 21e is accommodated in the depression 311e, the lower surface of the light source board 21e is attached with the bottom wall 11e to have a sufficient thermal contact for heat dissipation, and the light-emitting unit 22e is located in the second via hole 312e. The second pressing piece 32e is further provided with a third via hole 321e running through an upper surface and a lower surface thereof; the third via hole 321e is correspondingly provided above the second via hole 312e; an aperture of the third via hole 321e is gradually enlarged from an inner side to an outer side; and the light-emitting unit 32e further emits light outwards through the third via hole 321e. The lighting device 100e according to this example further includes a screw (not illustrated), and the screw passes through the second pressing piece 32e and the first pressing piece 31e and then is accommodated in the accommodating hole 112e to achieve a connection between the fixing structure 3e and the light body 1e. In other alternative examples, the light source board 21e may also be mounted with only one pressing piece structure or one fixing structure, or, the light source board 21e may be directly mounted and fixed onto the bottom wall 11e of the light body 1e.

The lighting device 100e according to this example may further include a drive power component (not illustrated), and the drive power component may be provided in the light body 1e, or may also be provided outside the light body 1e.

As illustrated in FIG. 16 and FIG. 17, the light-transmitting plate 6e is a circular cover plate, which is fixed between the face ring 7e and an upper end surface of the reflector 5e. The light-transmitting plate 6e shields the light emergent port 54e of the reflector 5e, and is used for preventing against ash and improving safety of the lighting device 100e; and at the same time, it also achieves uniform light effect. In this example, the light-transmitting plate 6e is transparent; and in other alternative example, it may also have other properties such as a frosted plate.

As illustrated in FIG. 16 and FIG. 17, the face ring 7e has a circular ring shape, an outer side face of the face ring 7e is provided with a plurality of first buckles 71e, and an inner side face of the face ring 7e is provided with a plurality of second buckles 72e. The first buckle 71e is clamped by the rib 121e of the light body 1e to achieve a connection between the face ring 7e and the light body 1e. In this example, the first buckle 71e and the second buckle 72e have a height difference in a height direction, that is, the first buckle 71e and the second buckle 72e are located at positions of different heights.

Figure 21:
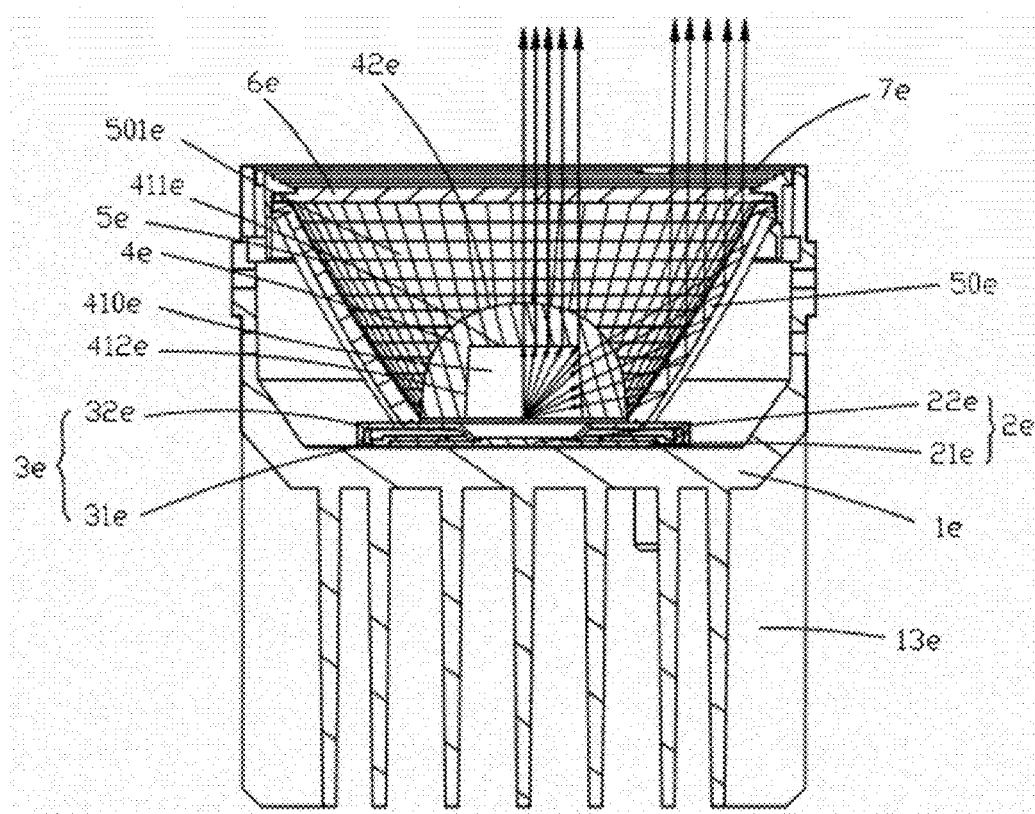
FIG. 21 is a cross-sectional view taken along line A-A in FIG. 14.
Figure 22:
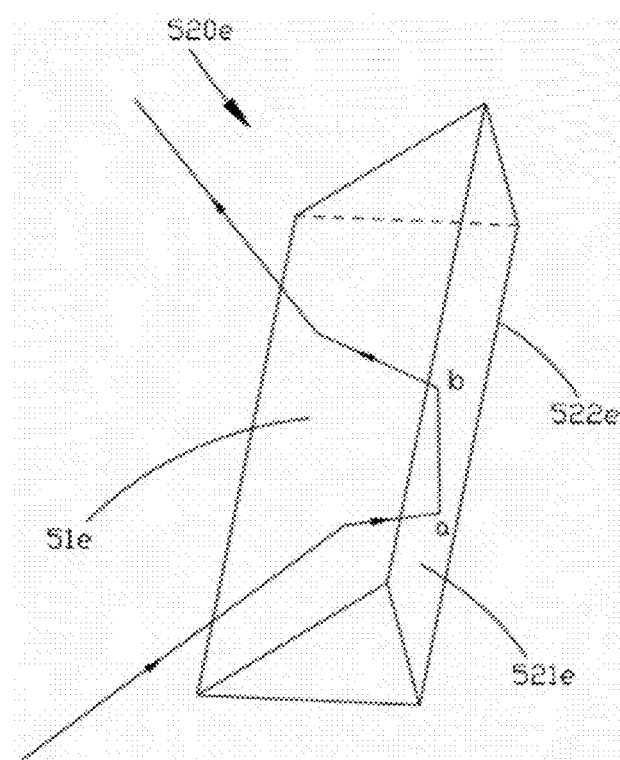
FIG. 22 is a schematic diagram of an optical path in a vertical direction with a single sawtooth structure as an example in a reflector within the lighting device provided by Example 5 of the present disclosure.

As illustrated in FIG. 16 to FIG. 18 and in FIG. 21, the lens 4e is a transparent hemispherical optical element, and the lens 4e has a first light incident surface 41e, a first light emergent surface 42e, and an accommodating chamber 410e for accommodating the light-emitting unit 22e. The first light incident surface 41e includes an upper light incident surface 411e and a side light incident surface 412e; the upper light incident surface 411e is a bottom face of the accommodating chamber 410e, and the side light incident surface 412e is a side face of the accommodating chamber 410e. The upper light incident surface 411e and the side light incident surface 412e are both flat surfaces, and the first light emergent surface 42e is a smooth curved surface. In this example, the lens 4e is a common optical element for controlling a light emergent angle of the light-emitting unit 22e. In other alternative example, surface shapes of the upper light incident surface 411e, the side light incident surface 412e and the first light emergent surface 42e are not limited to the foregoing description, and may also be double curved surfaces having different curvatures, or a combination of other surface shapes, etc. Which all fall within the scope of the present disclosure.

As illustrated in FIG. 16 to FIG. 18 and in FIG. 21, the reflector 5e is a transparent optical element, which has an annular shape and a uniform thickness. The reflector 5e has a side wall 50e, an inner surface 51e, an outer surface 52e, a light incident port 53e and a light emergent port 54e; the side wall 50e encloses an optical space 501e in communication with the light incident port 53e and the light emergent port 54e. The upper end surface of the reflector 5e is provided with a plurality of guiding grooves 55e; the second buckles 72e are accommodated in the guiding grooves 55e; a connection of the reflector 5e with the face ring 7e and a disassembling of the reflector 5e from the face ring 7e is achieved by rotating the reflector 5e clockwise or counterclockwise. The lens 4e is surrounded by the side wall 50e of the reflector 5e and extends into the optical space 501e. Light emitted by the light-emitting unit 22e has one portion refracted by the lens 4e and directly emitted through the light emergent port 54e; and the other portion incident onto the side wall 50e through the optical space 501e, reflected by the side wall 50e, entering the optical space 501e again, and emitted through the light emergent port 54e. The lens 4e and the reflector 5e may be integrally formed, or may also be separately molded and respectively assembled to the light body 1e or to a mounting structure (not illustrated), or the lens 4e and the reflector 5e are assembled and combined together and then assembled to the light body 1e or to the mounting structure (not illustrated).

Specifically, the inner surface 51e is a second light incident surface of the reflecting device, and is also a second light emergent surface of the reflecting device, which includes a plurality of successively arranged microstructures 510e each having a circular arc surface; and in other alternative examples, microstructures may not be provided. The inner surface 51e subjected to surface microstructure treatment can more accurately control the light emergent angle of the light-emitting assembly and ensure uniformity of emergent light. The outer surface 52e is provided thereon with a plurality of successively arranged sawtooth structures 520e. Each of the sawtooth structures 520e includes a first reflecting surface 521e and a second reflecting surface 522e; the first reflecting surface 521e and the second reflecting surface 522e are perpendicular to each other and intersected with each other to form a ridge line, and the ridge line may be a straight line or may also be an arc line. Two ends of each of the sawtooth structures 520e respectively extend to the upper end surface and a lower end surface of the reflector 5e, so that light incident on the side wall 50e may be reflected to a certain extent.

In other alternative examples, the sawtooth structure 520e may also be arranged as segments over the outer surface 52e, such that a total reflection only occurs at a position where the sawtooth structure 520e is provided. In other implementation modes, an included angle between the first reflecting surface 521e and the second reflecting surface 522e may not be 90°, that is, may be less than or greater than 90°; however, a light effect of the reflector 5e is optimal and a total reflection may be implemented in the case where the included angle is 90°. In this example, an aperture of the light incident port 53e of the reflector 5e is smaller than an aperture of the light emergent port 54e. In other alternative implementation modes, the aperture of the light incident port 53e may also be equal to the aperture of the light emergent port 54e, that is, the reflector 5e has a straight cylindrical shape; and such a structure can not only allow the side wall 50e to implement total reflection, but also allow light to be emitted through the light emergent port 54e.

The reflector 5e is integrally made of a transparent plastic or glass material, in which the plastic material may be PMMA, PC, and the like. The reflector 5e may be fabricated as thin as 2 mm, so in the case where a structural size of the reflector 5e is very large, material costs and molding difficulties can be reduced. Moreover, it should be noted that, in mold design or molding process, due to the problem of processing accuracy, a rounded corner would be formed at an intersection line between the first reflecting surface 521e and the second reflecting surface 522e of the reflector 5e, so that light incident on the rounded corner is refracted and emitted to form stray light; however, the rounded corner has little effect on a total light effect and a beam angle of the reflector 5e; thus, theoretically, the reflector 5e still can be considered as a total reflection lens. Of course, it may also improve the transmittance of the reflector 5e by enlarging the rounded corner.

Figure 19:
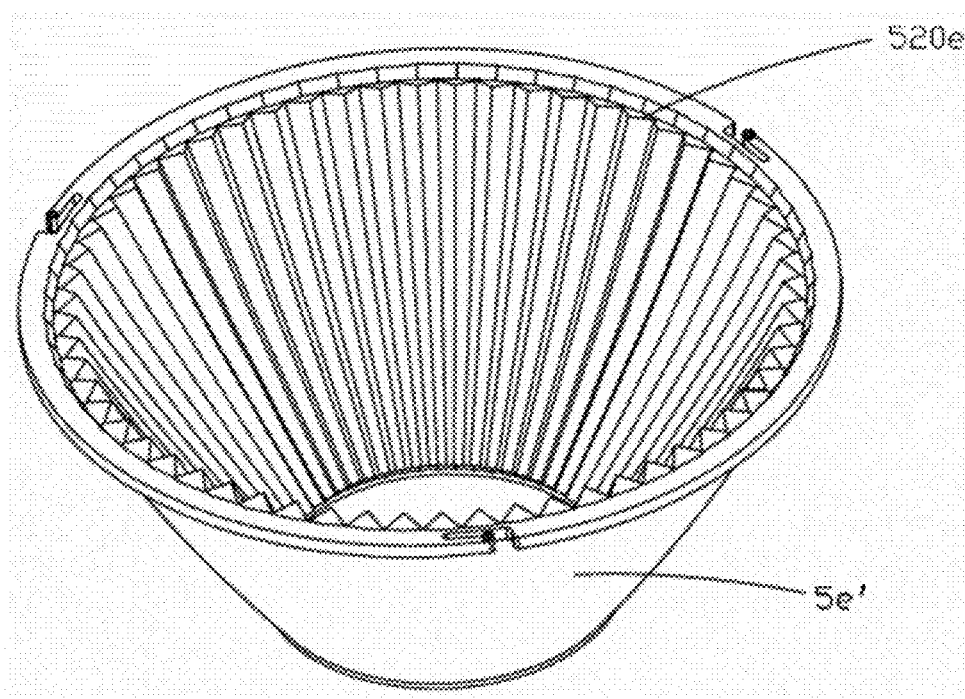
FIG. 19 is a stereoscopic schematic diagram of another reflecting device applied to the lighting device provided by Example 5 of the present disclosure.
Figure 20:
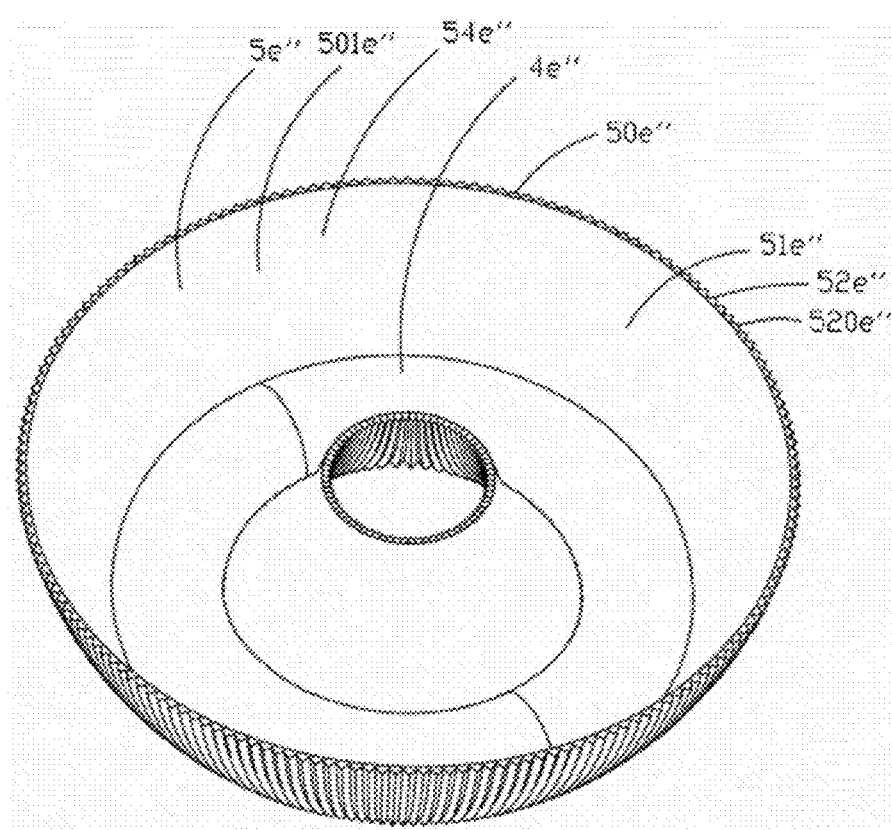
FIG. 20 is a stereoscopic schematic diagram of still another reflecting device applied to the lighting device provided by Example 5 of the present disclosure.

In other alternative example, as illustrated in FIG. 19, a sawtooth structure 520e may be provided on an inner surface of a reflector 5e', and an outer surface of the reflector 5e' is configured as a smooth wall surface. As illustrated in FIG. 20, a reflecting device may also have a rotary-shape structure, and include a lens 4e" having a rotary shape and a reflector 5e"; the lens 4e" and the reflector 5e" are both transparent; the reflector 5e" has two annular side walls 50e" as well as an annular light emergent port 54e" formed by the two side walls 50e"; the two annular side walls 50e" enclose an annular optical space 501e" in communication with a light emergent port 54e"; the lens 4e" is surrounded by the two side walls 50e" of the reflector 5e" and extends into the optical space 501e'; and a light-emitting assembly (not illustrated) is provided in an accommodating chamber (not illustrated) of the lens 4e". The side wall 50e" of the reflector 5e" has an inner surface 51e" and an outer surface 52e"; the inner surface 51e" is a smooth wall surface, and the outer surface 52e" is provided thereon with a plurality of successively arranged sawtooth structures 520e".

In the case where the first reflecting surface 521e and the second reflecting surface 522e are perpendicular to each other and the side wall 50e can achieve a total reflection, a direction of an optical path within the reflecting device 10 is particularly described as below.

Figure 23:
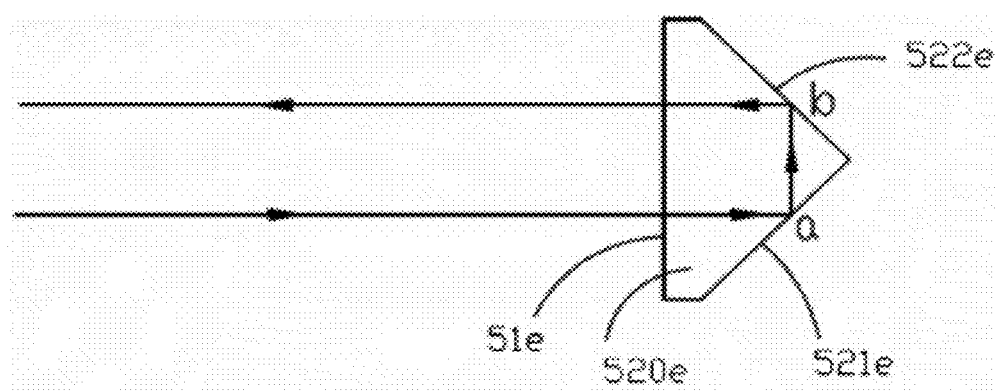
FIG. 23 is a schematic diagram of an optical path in a horizontal direction with a single sawtooth structure as an example in a reflector within the lighting device provided by Example 5 of the present disclosure.
Figure 24:
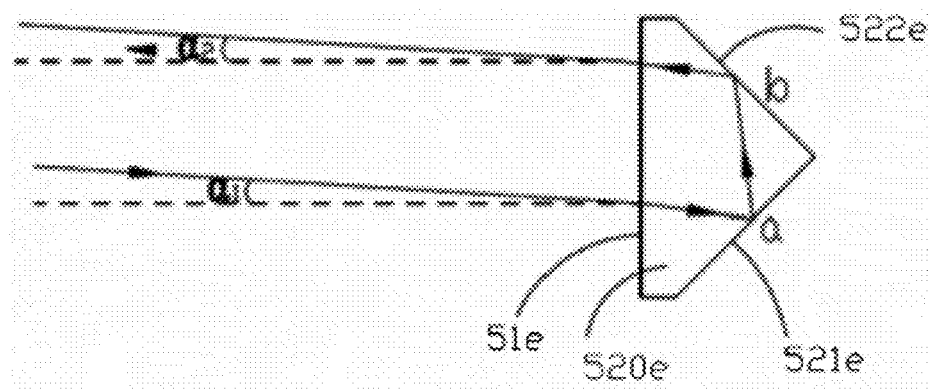
FIG. 24 is a schematic diagram of another optical path in the horizontal direction with a single sawtooth structure as an example in the reflector within the lighting device provided by Example 5 of the present disclosure.

In conjunction with FIG. 21 to FIG. 24, light emitted by the light-emitting unit 22e has one portion collimated from the upper light incident surface 411e to enter the lens 4e, refracted by the lens 4e and directly emitted from the first light emergent surface 42e, and then emitted through the light emergent port 54e; and the other portion entering the 4e from the side light incident surface 412e, refracted by the lens 4e and emitted from the first light emergent surface 42e, incident onto the inner surface 51e, reflected by the side wall 50e, and then emitted through the light emergent port 54e. The light is reflected within the side wall 50e, and its optical path is specifically as follows: the light is incident from the inner surface 51e onto a point a of the first reflecting surface 521e on the first light emergent surface 42e, totally reflected to a point b of the second reflecting surface 522e, totally reflected by the second reflecting surface 522e back to the inner surface 51e, emitted from the inner surface 51e and then emitted through the light emergent port 54e. As illustrated in FIG. 23, with respect to a single sawtooth structure 520e, from a plan view, when the light is incident onto the point a of the first reflecting surface 521e, it will be reflected to the point b of the second reflecting surface 522e according to the principle of total reflection, then reflected from the point b of the second reflecting surface 522e and emitted; and the final emergent light and the incident light conform to a total reflection angle relationship. As known, in order to implement total reflection inside the lens, an incident angle between light and a reflecting surface must be large enough, otherwise, the light will be transmitted to the outside; and the incident angle will vary depending on the material of the lens. It can be seen from FIG. 24 that, if there is no sawtooth structure provided on the light emergent surface, that is, if the light emergent surface is parallel to the light incident surface, the incident angle is 0° when the light arrives at the reflecting surface, so the light can only be transmitted without total reflection; after the sawtooth structure is added, when the light arrives at the point a of the first reflecting surface 521e, the incident angle is 45°, which is larger than a critical angle, so that a total reflection can be implemented.

When the light-emitting unit 22e is located at a central position of the light source board 21e, because the reflector 5e according to this example has a rotationally axisymmetric structure, for every position on the inner surface 51e, light emitted by the reflector 5e is always perpendicular to the inner surface 51e as viewed from a horizontal direction; as described above, the incident angle of light arriving at the first reflecting surface 521e and the incident angle of light arriving at the second reflecting surface 522e are both 45°, and a total reflection can be achieved. However, in the case of a plurality of light-emitting units 22e, these light-emitting units 22e will be arranged on the light source board 21e to form a light-emitting surface having a certain area, so there is a certain horizontal incident angle $\alpha_1$ for the light incident on the inner surface 51e; in such case, when the light is refracted and then arrives at the first reflecting surface 521e of the sawtooth structure 520e, the incident angle becomes 45° minus $\alpha_1$, that is, the incident angle is decreased, and a total reflection cannot be ensured. Therefore, it has to try to avoid such a case and concentrate the light-emitting units 22e in a central region of the light source board 21e, so that the horizontal incident angle $\alpha_1$ is as small as possible. Lenses made of different materials have different allowable ranges for the horizontal incident angle $\alpha_1$. For a lens made of PMMA, $\alpha_1 \leq 4.4°$; and for a lens made of PC, $\alpha_1 \leq 9.5°$. Because the sawtooth structure according to this example is a right-angled prism, an emergent angle $\alpha_2$ is equal to the horizontal incident angle $\alpha_1$. In a structure of a non-right-angled prism, the emergent angle $\alpha_2$ changes with the incident angle $\alpha_1$ to achieve different light effects.

Figure 25:
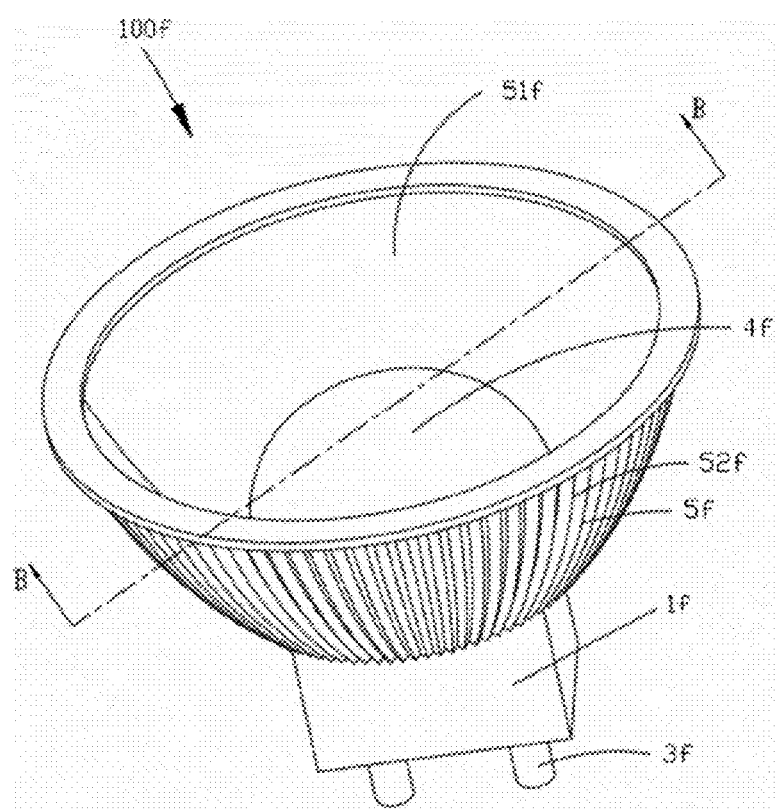
FIG. 25 is a stereoscopic schematic diagram of a lighting device provided by Example 6 of the present disclosure.
Figure 26:
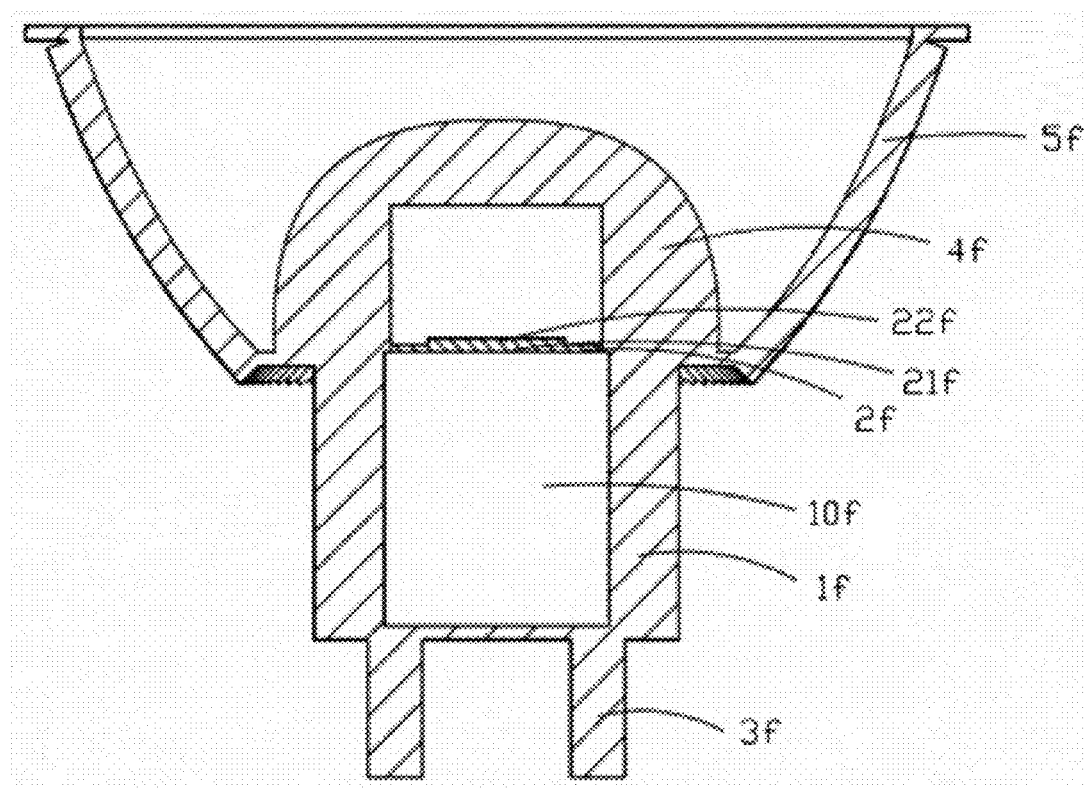
FIG. 26 is a cross-sectional view taken along line B-B in FIG. 25.

As illustrated in FIG. 25 and FIG. 26, Example 6 of the present disclosure provides a lighting device 100f, which has an integrated structure; and in other alternative examples, the lighting device 100f may also have an assembled structure. Particularly, the lighting device 100f includes a light body 1f; a light-emitting assembly 2f accommodated in the light body 1f; a reflecting device provided at a front end of the light body 1f and configured to perform light distribution to the light-emitting assembly 2f; and an electrical connection structure provided at a rear end of the light body 1f. The reflecting device includes a lens 4f and a reflector 5f; the reflector 5f has a cup-like annular shape and is transparent; and after light emitted by the light-emitting assembly 2f is subjected to light distribution of the lens 4f, the light has one portion directly emitted, and the other portion reflected by the reflector 5f and then emitted.

Hereinafter, respective components within the lighting device 100f provided by the example of the present disclosure and a connection relationship between the components will be particularly described.

As illustrated in FIG. 25 and FIG. 26, the light body if has a cylindrical shape and is made of a heat conductive metal or heat conductive plastic material; the light body if includes an accommodating chamber 10f; and the accommodating chamber 10f accommodates the light-emitting assembly 2f. The light body if may also accommodate a drive power component (not illustrated), or other electronic component(s) (not illustrated) for voltage transformation.

The light-emitting assembly 2f includes a light source board 21f and a light-emitting unit 22f located on the light source board 21f. Specifically, the light-emitting unit 22f is provided at a central portion of the light source board 21f. In this example, the light-emitting unit 22f is a LED light source; the number of the light-emitting unit 22f may be one or plural; and when the number of the light-emitting unit 22f is plural, it is necessary to concentrate the light-emitting units 22f in a central region of the light source board 21f.

The electrical connection structure 3f is a pair of positive and negative terminals extending out of the light body 1f; end portions of the electrical connection structure 3f in the accommodating chamber 10f are electrically connected with the light-emitting assembly 2f, and end portions of the electrical connection structure 3f extending out of the light body if are further connected with an alternating current power supply.

A structure of the lens 4f is substantially the same as that of the lens 4e, and a structure of the reflector 5f is substantially the same as that of the reflector 5e, which will not be repeated here. In the case where a total reflection of the reflector 5f is required, a horizontal incident angle $\alpha_1$ at which light is incident on the inner surface 51f needs to satisfy, for example, the range for the incident angle $\alpha_1$ as limited in Example 5. In other implementation mode(s) not requiring a total reflection of the lens, it is not necessary to satisfy the limited range for the incident angle $\alpha_1$, so that a transflective effect may be achieved on the outer surface 52f.

In summary, the lighting device provided by the example of the present disclosure involves low costs and has high light-emitting efficiency because the reflecting device therein is incorporated with two types of optical elements, one is a commonly used lens for adjusting the light emergent angle, and the other one is a transparent reflector for changing a light emergent direction, in which the reflector does not need to be subjected to a plating process to achieve a total reflection effect.

The present disclosure provides a reflecting device, a light source module and a lighting device which can achieve higher light-emitting efficiency.

According to an aspect of the present disclosure, a reflecting device is provided. The reflecting device includes a first optical element and a second optical element; the first optical element and the second optical element are both transparent; the second optical element has a side wall and a light emergent port; the side wall encloses an optical space in communication with the light emergent port; the first optical element is surrounded by the side wall of the second optical element and extends into the optical space; the first optical element has a light incident surface and a light emergent surface; and the light incident surface encloses an accommodating chamber.

Further, the side wall has an inner surface, an outer surface as well as an upper end portion and a lower end portion; the inner surface or the outer surface includes a plurality of successively arranged sawtooth structures; each of the sawtooth structures has a first surface and a second surface intersected with each other; and two ends of each of the sawtooth structures extend towards the upper end portion and the lower end portion, respectively.

Further, the two ends of the sawtooth structure extend to the upper end portion and the lower end portion, respectively.

Further, the first surface and the second surface are perpendicular to each other.

Further, the first surface and the second surface are intersected with each other to form a ridge line; and the ridge line is a straight line or an arc line.

Further, the side wall has an inner surface and an outer surface; the outer surface includes a plurality of successively arranged sawtooth structures, and the inner surface includes a plurality of microstructures each having a circular arc surface.

Further, the side wall has a uniform thickness and has an upper end portion; and the light emergent port is formed inside the upper end portion.

Further, the reflecting device further includes a base; and the first optical element and the second optical element are both provided on the base.

Further, the reflecting device has an annular shape, an arc shape, a straight-bar shape, or a rotary shape.

Further, a height of the first optical element is lower than a height of the second optical element.

According to another aspect of the present disclosure, a reflecting device is further provided. The reflecting device includes a first optical element and a second optical element; the first optical element and the second optical element are both transparent; the second optical element has a side wall and a light emergent port; the side wall encloses an optical space in communication with the light emergent port; the first optical element is surrounded by the side wall of the second optical element and extends into the optical space; the first optical element has a light incident surface and a light emergent surface; and the light incident surface encloses an accommodating chamber; the reflecting device is configured such that light emitted from the light emergent surface of the first optical element has one portion refracted by the first optical element and then directly emitted through the light emergent port; and the other portion entering the side wall through the optical space, reflected by the side wall, entering the optical space again, and then emitted through the light emergent port.

Further, the side wall has an inner surface, an outer surface as well as an upper end portion and a lower end portion; the inner surface or the outer surface includes a plurality of successively arranged sawtooth structures; each of the sawtooth structures has a first surface and a second surface intersected with each other; and two ends of each of the sawtooth structures extend towards the upper end portion and the lower end portion, respectively.

Further, the sawtooth structure is provided on the outer surface; the first surface and the second surface are respectively a first reflecting surface and a second reflecting surface; and light entering the side wall through the optical space and emitted through the light emergent port has an optical path as below: the incident light is refracted by the inner surface of the side wall to the first reflecting surface, reflected by the first reflecting surface to the second reflecting surface, then reflected by the second reflecting surface to the inner surface of the side wall, refracted by the inner surface and emitted to enter the optical space, and is finally emitted through the light emergent port.

Further, the sawtooth structure is provided on the inner surface; the first surface and the second surface are respectively a first refracting surface and a second refracting surface; and light entering the side wall through the optical space and emitted through the light emergent port has an optical path as below: the incident light is refracted by the first refracting surface or the second refracting surface of the inner surface to the outer surface, reflected by the outer surface back to the inner surface, then refracted by the inner surface to enter the optical space, and finally emitted through the light emergent port.

Further, light emitted from the light emergent surface and entering the side wall through the optical space has a portion thereof directly transmitted through the side wall.

Further, the sawtooth structure is provided on the outer surface; and an incident angle in a horizontal direction is less than 10°.

Further, the sawtooth structure is provided on the inner surface; the first surface and the second surface are intersected with each other to form a ridge line; and an included angle between a tangent line of any point on the ridge line and a plane where the light incident port is located is less than A, and wherein A is 40°.

Further, when the side wall is made of PC, A is equal to 38°; and when the side wall is made of acrylic, A is equal to 30°.

Further, the first surface and the second surface are perpendicular to each other.

Further, the sawtooth structure is provided on the outer surface; and the inner surface includes a plurality of microstructures each having a circular arc surface.

Further, the side wall has a uniform thickness and has an upper end portion; and the light emergent port is formed inside the upper end portion.

Further, the reflecting device further includes a base; and the first optical element and the second optical element are both provided on the base.

Further, the reflecting device has an annular shape, an arc shape, a straight-bar shape, or a rotationally axisymmetric shape.

According to yet another aspect of the present disclosure, a reflecting device is further provided. The reflecting device includes a first optical element and a second optical element; the first optical element and the second optical element are both transparent; the second optical element has a side wall and a light emergent port; the side wall has an inner surface, an outer surface, and a uniform thickness; the side wall encloses an optical space in communication with the light emergent port; the first optical element is surrounded by the side wall of the second optical element and extends into the optical space; the first optical element has a light incident surface and a light emergent surface; and the light incident surface encloses an accommodating chamber; the reflecting device is configured such that light emitted from the light emergent surface of the first optical element enters the side wall through the inner surface of the side wall, is reflected by the outer surface of the side wall to the inner surface of the side wall, and is emitted through the inner surface.

Further, the side wall further has an upper end portion and a lower end portion; the inner surface or the outer surface includes a plurality of successively arranged sawtooth structures; each of the sawtooth structures has a first surface and a second surface intersected with each other; and two ends of each of the sawtooth structures extend towards the upper end portion and the lower end portion, respectively.

Further, the first surface and the second surface are perpendicular to each other.

According to still another aspect of the present disclosure, a light source module is further provided. The light source module includes the above-described reflecting device and a light-emitting assembly, and the light-emitting assembly is provided in the accommodating chamber of the first optical element.

Further, the light-emitting assembly includes a light source board and a plurality of light-emitting units located on the light source board.

Further, the plurality of light-emitting units are provided at a central portion of the light source board.

According to further another aspect of the present disclosure, a lighting device is further provided. The lighting device includes a light body, a light-emitting assembly accommodated in the light body, and a reflecting device configured to perform light distribution to the light-emitting assembly; the reflecting device includes a first optical element and a second optical element, and the reflecting device is any of reflecting devices described above.

Further, the first optical element is a lens; and a height of the lens is less than a height of the second optical element.

Further, the light incident surface and the light emergent surface of the first optical element are double curved surfaces having a same curvature or different curvatures; or the light incident surface is composed of a plurality of intersecting planes, and the light emergent surface is a curved surface.

Further, the first optical element and the second optical element are integrally provided or separately provided.

Further, the light body has an accommodating chamber; and the light-emitting assembly, the first optical element, and the second optical element are all accommodated in the accommodating chamber.

Further, the lighting device further includes a fixing structure; the fixing structure is connected with the light body; and the light-emitting assembly is fixed in the fixing structure.

Further, the light-emitting assembly includes a light source board and a light-emitting unit located on the light source board.

Further, the light source board is integrally provided with a drive power component.

Further, the fixing structure includes a depression and a via hole in communication with the depression; the light source board is accommodated in the depression; and the light-emitting unit is located in the via hole and emits light outwards through the via hole.

Further, an aperture of the via hole is gradually enlarged from an inner side to an outer side.

Further, the fixing structure includes a first pressing piece and a second pressing piece connected with each other; the depression is located on an outer side surface of the first pressing piece; and the via hole runs through the first pressing piece and the second pressing piece.

Further, the lighting device further includes a light-transmitting plate; and the light-transmitting plate shields the light emergent port of the second optical element.

Further, the lighting device further includes a face ring; the face ring is coupled to the light body; and the light-transmitting plate is fixed between the face ring and the second optical element.

Further, the light body has an accommodating chamber; the light-emitting assembly is accommodated in the accommodating chamber; and the first optical element and the second optical element are both provided outside the accommodating chamber.

Further, the lighting device is configured such that light emitted from the light-emitting assembly, after being emitted through the light emergent surface of the first optical element, has one portion directly emitted through the light emergent port, and the other portion entering the side wall through the optical space, reflected by the side wall, entering the optical space again, and emitted through the light emergent port.

Beneficial effect: the lighting device provided by the example of the present disclosure involves low costs and has high light-emitting efficiency, because the reflecting device therein is incorporated with two types of optical elements, in which the first optical element is a commonly used lens for adjusting the light emergent angle, the second optical element is a transparent reflector for changing a light emergent direction, and the reflector does not need to be subjected to a plating process to achieve a total reflection effect.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The particular examples above further describe the objective(s), technical solutions and beneficial effects of the present disclosure in more details. It should be explained that, the above are merely examples of the present disclosure, and the protection scope of the present disclosure is not limited thereto. Any modifications, substitutions or improvements made by those skilled in the art within the spirit and principle of the present disclosure should be fallen within the protection scope of the present disclosure.

What is claimed is:

1. A reflecting device, comprising:
a first optical element, wherein the first optical element is transparent, and wherein the first optical element includes:
a light incident surface;
a light emergent surface;
wherein the light incident surface encloses an accommodating chamber and wherein light incident surface forms a continuous convex surface that protrudes toward the enclosed accommodating chamber; and
a second optical element, wherein the second optical element is transparent, and wherein the second optical element includes:
a side wall;
a light emergent port;
wherein the side wall encloses an optical space in communication with the light emergent port, wherein the side wall comprises a plurality of successively arranged sawtooth structures, wherein the sawtooth structures comprise a first refracting surface and a second refracting surface which are perpendicular to each other, wherein light entering the first refracting surface is refracted and is totally reflected before being refracted by the second refracting surface;
wherein the side wall has an upper end portion and a lower end portion, and the plurality of sawtooth structures each comprise two ends, wherein respective ends of each of the sawtooth structures extend towards the upper end portion and the lower end portion; and
wherein the first optical element is surrounded by the side wall of the second optical element and extends into the optical space.

2. The reflecting device according to claim 1, wherein the side wall has an inner surface, an outer surface, and wherein the inner surface comprises the plurality of successively arranged sawtooth structures.

3. The reflecting device according to claim 2, wherein the respective ends of each of the sawtooth structures extend to the upper end portion and the lower end portion.

4. The reflecting device according to claim 2, wherein the first refracting surface and the second refracting surface are intersected with each other to form a ridge line, and the ridge line is a straight line or an arc line.

5. The reflecting device according to claim 1, wherein the side wall has a uniform thickness, and the light emergent port is formed inside the upper end portion.

6. The reflecting device according to claim 1, further comprising a base, wherein the first optical element and the second optical element are both provided on the base.

7. The reflecting device according to claim 1, wherein the reflecting device has an annular shape, an arc shape, a straight-bar shape, or a rotary shape.

8. The reflecting device according to claim 2, wherein a height of the first optical element is lower than a height of the second optical element.

9. The reflecting device according to claim 1, wherein the reflecting device is configured such that light emitted from the light emergent surface of the first optical element has one portion refracted by the first optical element and then directly emitted through the light emergent port; and the other portion entering the side wall through the optical space, reflected by the side wall, entering the optical space again, and then emitted through the light emergent port.

10. The reflecting device according to claim 9, wherein the side wall has an inner surface and an outer surface, wherein the inner surface comprises the plurality of successively arranged sawtooth structures.

11. The reflecting device according to claim 9, wherein the plurality of sawtooth structures are provided on an inner surface of the side wall; and light entering the side wall through the optical space and emitted through the light emergent port has an optical path: the incident light is refracted by the first refracting surface of the inner surface to an outer surface of the side wall, reflected by the outer surface back to the inner surface, then refracted by the second refracting surface to enter the optical space, and finally emitted through the light emergent port.

12. The reflecting device according to claim 9, wherein light emitted from the light emergent surface and entering the side wall through the optical space has a portion thereof directly transmitted through the side wall.

13. The reflecting device according to claim 10, wherein the plurality of sawtooth structures are provided on the inner surface; the first refracting surface and the second refracting surface are intersected with each other to form a ridge line; and an included angle between a tangent line of any point on the ridge line and a plane where the light emergent port is located is less than A, and wherein A is 40°.

14. A light source module, comprising:
a reflecting device; and
a light-emitting assembly;
wherein the reflecting device comprises:
a first optical element, wherein the first optical element is transparent, and the first optical element includes:
a light incident surface,
a light emergent surface, and
wherein the light incident surface encloses an accommodating chamber and wherein the light incident surface forms a continuous convex surface that protrudes toward the enclosed accommodating chamber; and
a second optical element, wherein the second optical element is transparent and the second optical element includes:
a side wall;
a light emergent port,
wherein the side wall encloses an optical space in communication with the light emergent port, wherein the side wall comprises a plurality of successively arranged sawtooth structures, wherein the sawtooth structures comprise a first refracting surface and a second refracting surface which are perpendicular to each other, wherein light entering the first refracting surface is refracted and is totally reflected before being refracted by the second refracting surface;
wherein the side wall has an upper end portion and a lower end portion, and the plurality of sawtooth structures each comprise two ends, wherein respective ends of each of the sawtooth structures extend towards the upper end portion and the lower end portion;
wherein the first optical element is surrounded by the side wall of the second optical element and extends into the optical space, and
wherein the light-emitting assembly is provided in the accommodating chamber of the first optical element.

15. A lighting device, comprising:
a light body,
a light-emitting assembly accommodated in the light body, and
a reflecting device configured to perform light distribution to the light-emitting assembly, wherein the reflecting device comprises:
a first optical element, wherein the first optical element is transparent, and the first optical element includes:
a light incident surface;
a light emergent surface; and
wherein the light incident surface encloses an accommodating chamber and wherein the light incident surface forms a continuous convex surface that protrudes toward the enclosed accommodating chamber;
a second optical element, wherein the second optical element is transparent and the second optical element includes:
a side wall;
a light emergent port, and
wherein the side wall encloses an optical space in communication with the light emergent port, wherein the side wall comprises a plurality of successively arranged sawtooth structures, wherein the sawtooth structures comprise a first refracting surface and a second refracting surface which are perpendicular to each other, wherein light entering the first refracting surface is refracted and is totally reflected before being refracted by the second refracting surface;
wherein the side wall has an upper end portion and a lower end portion, and the plurality of sawtooth structures each comprise two ends, wherein respective ends of each of the sawtooth structures extend towards the upper end portion and the lower end portion; and
wherein the first optical element is surrounded by the side wall of the second optical element and extends into the optical space.

* * * * *